(12) United States Patent
Lymberopoulos et al.

(10) Patent No.: US 11,905,811 B2
(45) Date of Patent: Feb. 20, 2024

(54) FLUID CONDUIT CONNECTOR SYSTEM

(71) Applicant: SAFOCO, INC., Houston, TX (US)

(72) Inventors: David Lymberopoulos, Houston, TX (US); Andrew Allen Kadavy, Houston, TX (US); Peter Lanh Ly, Houston, TX (US)

(73) Assignee: SAFOCO, INC., Houston, TX (US)

( * ) Notice: Subject to any disclaimer, the term of this patent is extended or adjusted under 35 U.S.C. 154(b) by 0 days.

(21) Appl. No.: 18/080,415

(22) Filed: Dec. 13, 2022

(65) Prior Publication Data

US 2023/0112693 A1 Apr. 13, 2023

Related U.S. Application Data

(63) Continuation of application No. 16/922,703, filed on Jul. 7, 2020, now Pat. No. 11,530,601.

(51) Int. Cl.
*E21B 43/26* (2006.01)
*E21B 33/068* (2006.01)

(52) U.S. Cl.
CPC ........ *E21B 43/2607* (2020.05); *E21B 33/068* (2013.01)

(58) Field of Classification Search
CPC ... E21B 43/2607; E21B 33/068; F16K 27/003
See application file for complete search history.

(56) References Cited

U.S. PATENT DOCUMENTS

| 333,270 | A | 12/1885 | Wilmer |
| 373,522 | A | 11/1887 | Giles |
| 536,342 | A | 3/1895 | Harrington |
| 1,182,146 | A | 5/1916 | Crispin |
| 1,796,159 | A | 3/1931 | Pallady |
| 1,914,741 | A | 6/1933 | Gysling |
| 2,109,031 | A | 2/1938 | O'Neal |
| 2,319,543 | A | 5/1943 | Hall |

(Continued)

FOREIGN PATENT DOCUMENTS

| CN | 2050919 U | 1/1990 |
| CN | 2154392 Y | 1/1994 |

(Continued)

OTHER PUBLICATIONS

PCT International Search Report and Written Opinion dated Sep. 15, 2021, for International Application No. PCT/US2021/037893.

(Continued)

*Primary Examiner* — Nicole Coy
*Assistant Examiner* — Nicholas D Wlodarski
(74) *Attorney, Agent, or Firm* — Patterson + Sheridan, LLP

(57) ABSTRACT

A fluid conduit system includes a trunk line and a manifold header coupled to the trunk line. The manifold header has a first bore in fluid communication with the trunk line and a second bore intersecting the first bore. A first manifold valve is coupled to the manifold header. A second manifold valve is coupled to the first manifold valve. A fracture header is coupled to the second manifold valve. A plurality of connection rods is coupled to the manifold header and to the fracture header. Each connection rod extends through a corresponding hole in the first manifold valve and a corresponding hole in the second manifold valve.

20 Claims, 14 Drawing Sheets

(56) References Cited

U.S. PATENT DOCUMENTS

| | | |
|---|---|---|
| 2,438,472 A | 3/1948 | Calcott |
| 2,753,940 A | 7/1956 | Bonner |
| 2,780,482 A | 2/1957 | Brown |
| 4,138,147 A | 2/1979 | Manchester et al. |
| 4,285,500 A | 8/1981 | Illing et al. |
| 4,471,799 A | 9/1984 | Buck |
| 4,570,673 A | 2/1986 | Kendrick et al. |
| 4,603,887 A | 8/1986 | Mayfield et al. |
| 4,618,173 A | 10/1986 | Dopyera et al. |
| 4,840,410 A | 6/1989 | Welkey |
| 4,874,008 A | 10/1989 | Lawson |
| 4,993,489 A | 2/1991 | McLeod |
| 5,098,132 A | 3/1992 | Burton |
| 5,261,765 A | 11/1993 | Nelson |
| 5,492,373 A | 2/1996 | Smith |
| 5,718,460 A | 2/1998 | Glunt et al. |
| 6,003,604 A | 12/1999 | Wilkins |
| 6,113,157 A | 9/2000 | Wilkins |
| 6,158,781 A | 12/2000 | Aaron, III |
| 6,209,927 B1 | 4/2001 | Katra et al. |
| 6,666,266 B2 | 12/2003 | Starr et al. |
| 6,920,925 B2 | 7/2005 | Duhn et al. |
| 6,929,287 B2 | 8/2005 | Flindall |
| 7,237,808 B2 | 7/2007 | Porter |
| 7,686,041 B2 | 3/2010 | Eidsmore et al. |
| 7,841,394 B2 | 11/2010 | McNeel et al. |
| 8,469,108 B2 | 6/2013 | Kajaria et al. |
| 8,474,521 B2 | 7/2013 | Kajaria et al. |
| 8,490,685 B2 | 7/2013 | Tolman et al. |
| 8,496,062 B2 | 7/2013 | Kajaria et al. |
| 8,616,590 B2 | 12/2013 | Travis et al. |
| 8,656,990 B2 | 2/2014 | Kajaria et al. |
| 8,695,693 B2 | 4/2014 | Nguyen et al. |
| 8,944,159 B2 | 2/2015 | Guidry et al. |
| 8,978,763 B2 | 3/2015 | Guidry |
| 9,009,945 B2 | 4/2015 | Travis et al. |
| 9,068,450 B2 | 6/2015 | Guidry |
| 9,470,348 B1 | 10/2016 | Bass et al. |
| 9,903,190 B2 | 2/2018 | Conrad et al. |
| 9,915,132 B2 | 3/2018 | Conrad |
| 9,932,800 B2 | 4/2018 | Guidry |
| 9,945,200 B2 | 4/2018 | Travis et al. |
| 9,976,679 B2 | 5/2018 | Uenishi et al. |
| 10,087,701 B2 | 10/2018 | Bailey et al. |
| 10,094,195 B2 | 10/2018 | Guidry |
| 10,132,146 B2 | 11/2018 | Guidry |
| 10,252,405 B2 | 4/2019 | Bartels et al. |
| 10,323,475 B2 | 6/2019 | Christopherson et al. |
| 10,385,643 B2 | 8/2019 | Guidry |
| 10,385,644 B2 | 8/2019 | Guidry et al. |
| 10,385,645 B2 | 8/2019 | Guidry |
| 10,392,914 B2 | 8/2019 | Kajaria |
| 10,428,614 B2 | 10/2019 | Guidry et al. |
| 10,450,823 B1 | 10/2019 | Pruitt et al. |
| 10,459,461 B2 | 10/2019 | Boyd et al. |
| 10,487,637 B2 | 11/2019 | Guidry et al. |
| 10,538,987 B2 | 1/2020 | Guidry et al. |
| 10,544,643 B2 | 1/2020 | Roesner et al. |
| 10,570,692 B1 | 2/2020 | Sizemore et al. |
| 11,384,876 B2 | 7/2022 | Kadavy |
| 2011/0030963 A1 | 2/2011 | Demong et al. |
| 2011/0048695 A1 | 3/2011 | Cherewyk et al. |
| 2011/0204626 A1 | 8/2011 | Degutis et al. |
| 2011/0304138 A1 | 12/2011 | Commoner |
| 2012/0181785 A1 | 7/2012 | Kajaria |
| 2012/0213651 A1 | 8/2012 | Ochoa et al. |
| 2013/0075080 A1 | 3/2013 | Guidry |
| 2013/0263932 A1 | 10/2013 | Baxter et al. |
| 2017/0045166 A1 | 2/2017 | Doolittle |
| 2017/0370172 A1* | 12/2017 | Tran ................ B01F 23/43 |
| 2019/0010781 A1 | 1/2019 | Tran |
| 2019/0093444 A1 | 3/2019 | Guidry |
| 2020/0048980 A1 | 2/2020 | Jespersen et al. |
| 2020/0088021 A1 | 3/2020 | Guidry |
| 2021/0222514 A1* | 7/2021 | Cook ................ E21B 33/0355 |
| 2022/0010819 A1 | 1/2022 | Lymberopoulos et al. |
| 2022/0010898 A1 | 1/2022 | Lymberopoulos et al. |
| 2022/0186577 A1 | 6/2022 | Boyd et al. |

FOREIGN PATENT DOCUMENTS

| | | |
|---|---|---|
| CN | 1067951 C | 7/2001 |
| CN | 2533365 Y | 1/2003 |
| CN | 200949719 Y | 9/2007 |
| CN | 201531238 U | 7/2010 |
| DE | 8138319 U1 | 5/1983 |
| DE | 202005012296 U1 | 10/2005 |
| FR | 2591308 B1 | 10/1988 |
| GB | 2102091 B | 9/1985 |
| GB | 2199101 A | 6/1988 |
| JP | 8004961 | 1/1996 |
| KR | 100370505 B1 | 2/2003 |
| RU | 52919 U1 | 4/2006 |
| RU | 2301885 C1 | 6/2007 |
| WO | 2019063311 A1 | 4/2019 |
| WO | 2019113448 A1 | 6/2019 |
| WO | 2019234725 A1 | 12/2019 |

OTHER PUBLICATIONS

U.S. Office Action dated Nov. 18, 2021, in U.S. Appl. No. 16/922,690.
U.S. Office Action dated Apr. 14, 2022, for U.S. Appl. No. 16/922,690.

* cited by examiner

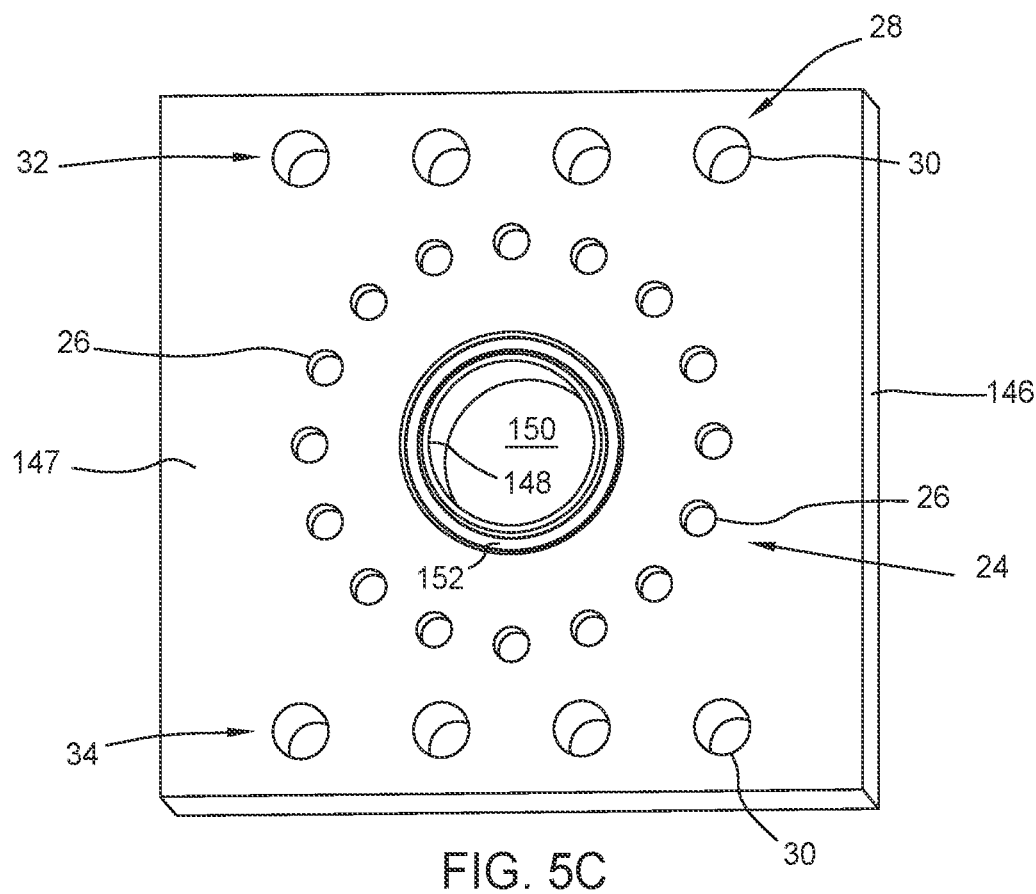
FIG. 5C
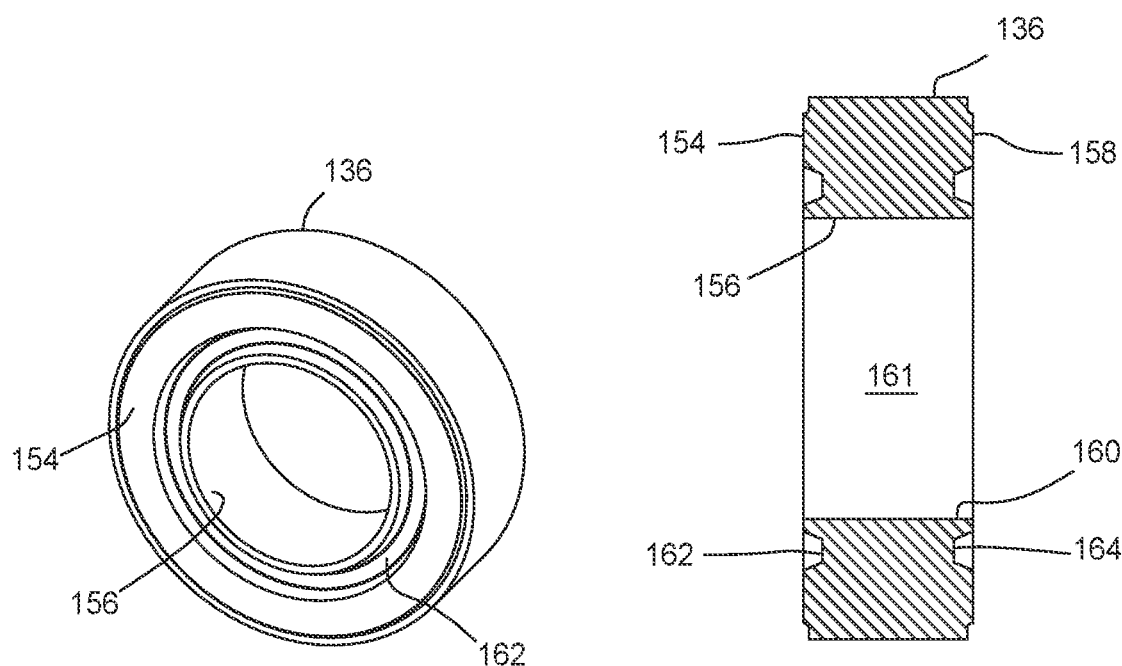
FIG. 5D
FIG. 5E

FLUID CONDUIT CONNECTOR SYSTEM

CROSS-REFERENCE TO RELATED APPLICATIONS

This application is a continuation of co-pending U.S. patent application Ser. No. 16/922,703, filed Jul. 7, 2020, which is herein incorporated by reference in its entirety.

BACKGROUND

Field

Embodiments described herein generally relate to a system for connecting fluid conduits, valves, and the like.

Description of the Related Art

The connecting of fluid conduits may be achieved by engaging threads of one conduit with corresponding complementary threads of another conduit. An alternative to a threaded connection is a bolted flanged connection. Some fluid conduit systems, such as those used for well treatments in the oil and gas industry, are used temporarily in a series of different locations. These fluid conduit systems are successively assembled at a work site, used to convey fluids, disassembled, transported to another site, reassembled, and so on. It is desirable for the connections of such systems to be robust and reliable, yet facilitate rapid assembly and disassembly.

SUMMARY

The present disclosure generally relates to a fluid conduit connection system, and to fluid conduit systems that include connectors of the fluid conduit connector system.

In one embodiment, a fluid conduit system includes a trunk line and a manifold header coupled to the trunk line. The manifold header has a first bore in fluid communication with the trunk line and a second bore intersecting the first bore. A first manifold valve is coupled to the manifold header. A second manifold valve is coupled to the first manifold valve. A fracture header is coupled to the second manifold valve. A plurality of connection rods is coupled to the manifold header and to the fracture header. Each connection rod extends through a corresponding hole in the first manifold valve and a corresponding hole in the second manifold valve.

In one embodiment, a fluid conduit system includes a trunk line having a trunk line throughbore. A manifold header is coupled to the trunk line. The manifold header has a first bore in fluid communication with the trunk line throughbore and a second bore intersecting the first bore. A first manifold valve is coupled to the manifold header. The first manifold valve has a first manifold valve throughbore and an array of holes positioned about the first manifold valve throughbore. A second manifold valve is coupled to the first manifold valve. The second manifold valve has a second manifold valve throughbore and an array of holes positioned about the second manifold valve throughbore. A fracture header is coupled to the second manifold valve. The fracture header has a first array of fracture header holes. A plurality of connection rods is coupled to the manifold header and to the fracture header. Each connection rod extends through a corresponding hole of the array of holes in the first manifold valve and a corresponding hole of the array of holes in the second manifold valve.

In one embodiment, a method of performing a well treatment operation, includes flowing a treatment fluid through a first fracture valve, a second fracture valve, a flow spool, and a third fracture valve into a well. A plurality of connection rods extends through the first fracture valve, the second fracture valve, and the flow spool into the third fracture valve. The third fracture valve is coupled to a fracture header by a flange. The method further includes ceasing the flowing of the treatment fluid, closing the third fracture valve, flowing fluid out of the well through the first fracture valve, the second fracture valve, and the flow spool, and removing the fracture header from the third fracture valve.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5C and 5D show external views of components of the embodiment of FIGS. 5A and 5B.

FIG. 5E shows a cross sectional view of the component depicted in FIG. 5D.

DETAILED DESCRIPTION

Embodiments of the present disclosure concern connections for fluid conduits, and are particularly suited for use with fluid conduits that, in use, are subject to repeated assembly and disassembly. Examples include conduits that are used in oil and gas applications, such as when pumping treatment fluids, such as acids and fracturing fluids, into wells.

Figure 1B:
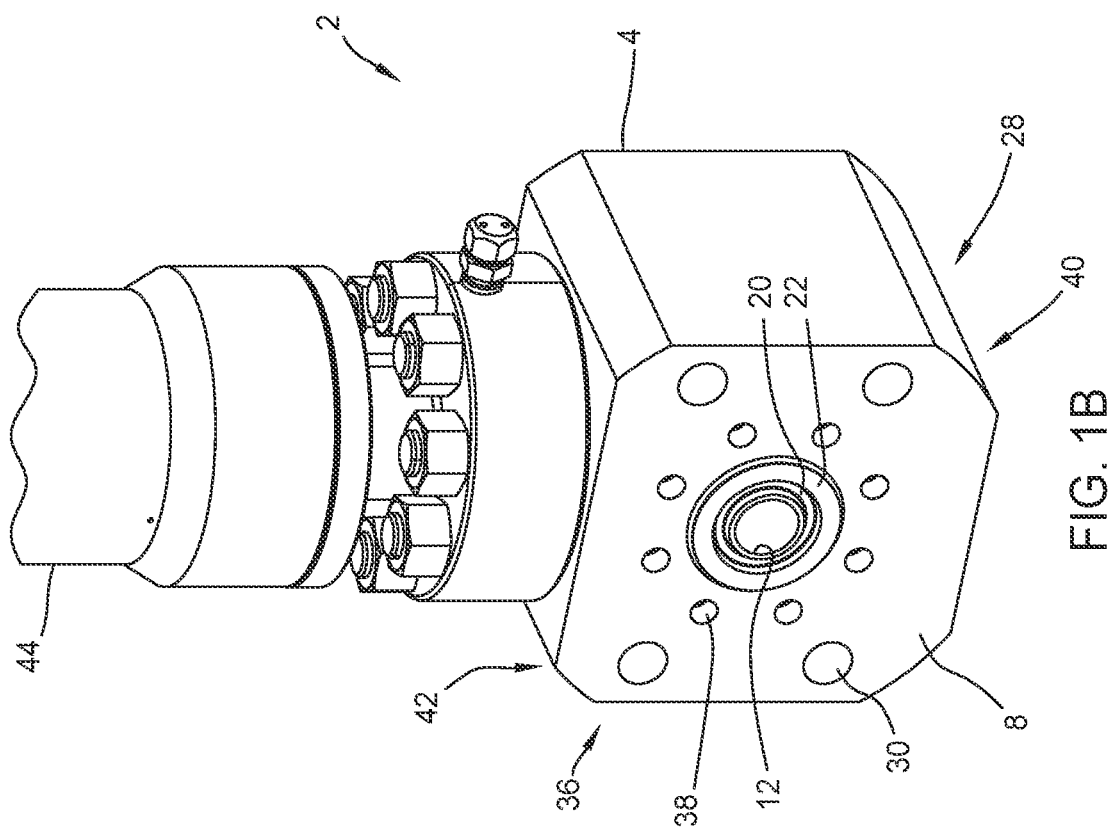
FIGS. 1A and 1B show an embodiment of a fluid conduit connector of a fluid conduit connector system.
Figure 1A:
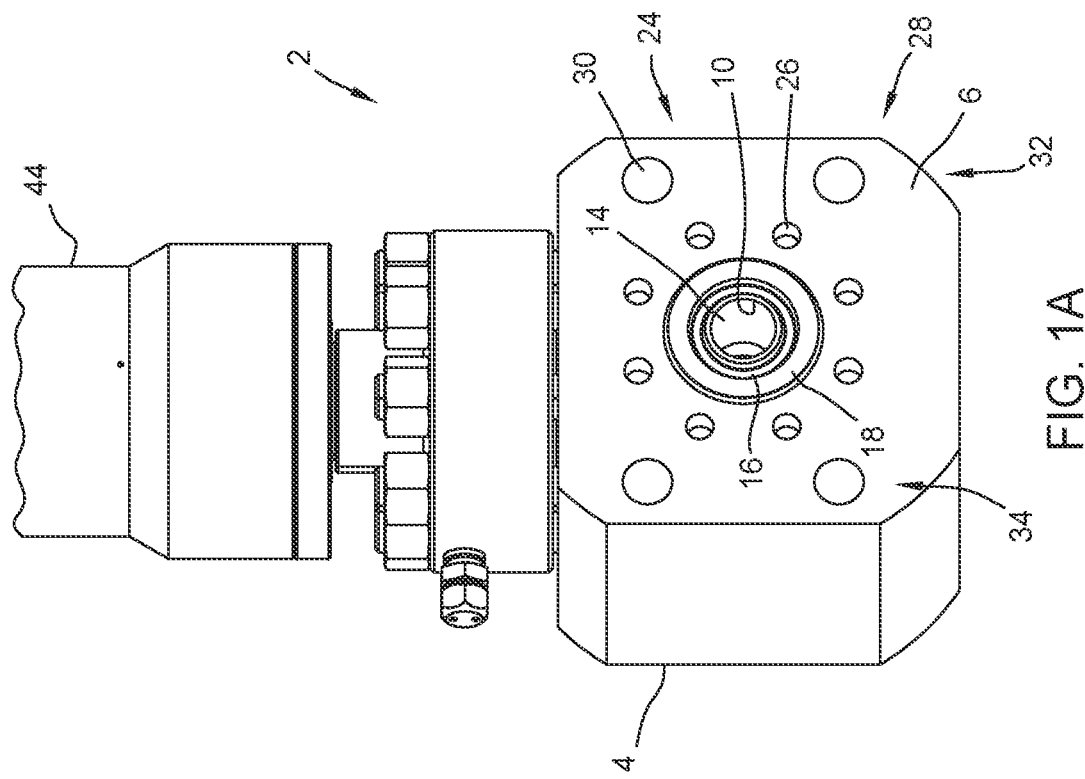
Figure 2A:
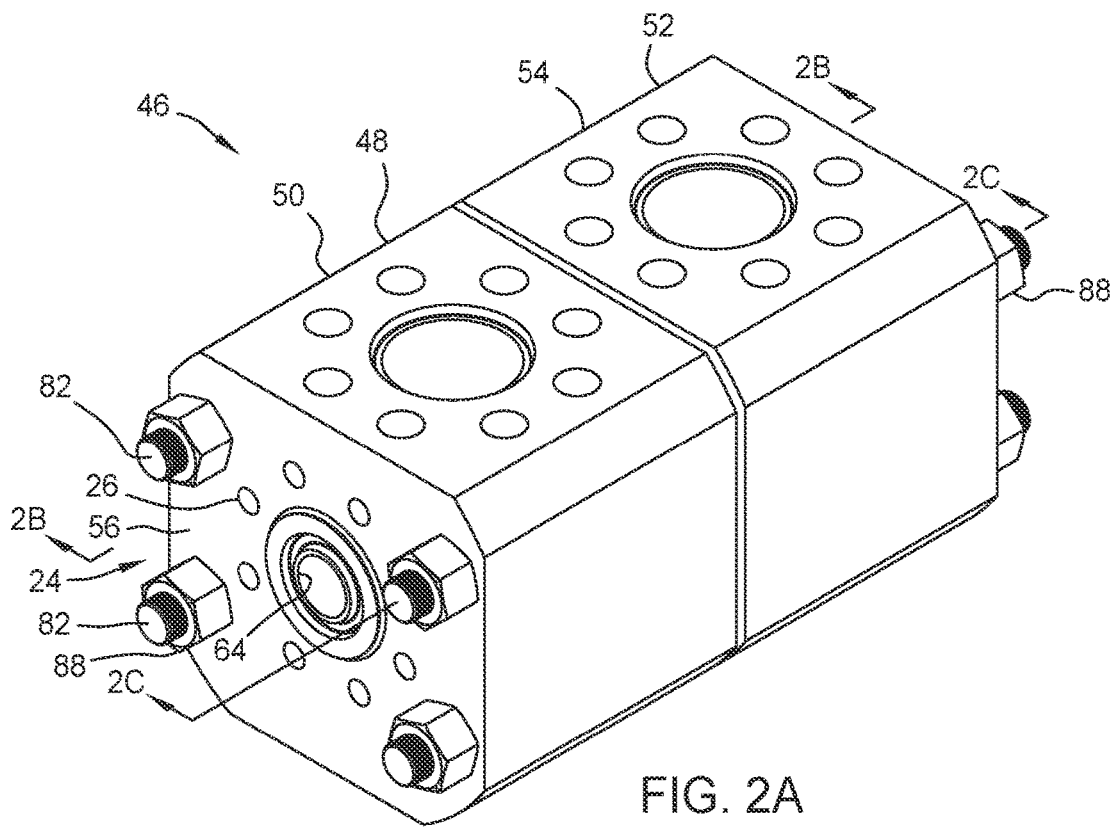
FIG. 2A shows an external view of two fluid conduit connectors of the embodiment of FIGS. 1A and 1B coupled together.
Figure 2B:
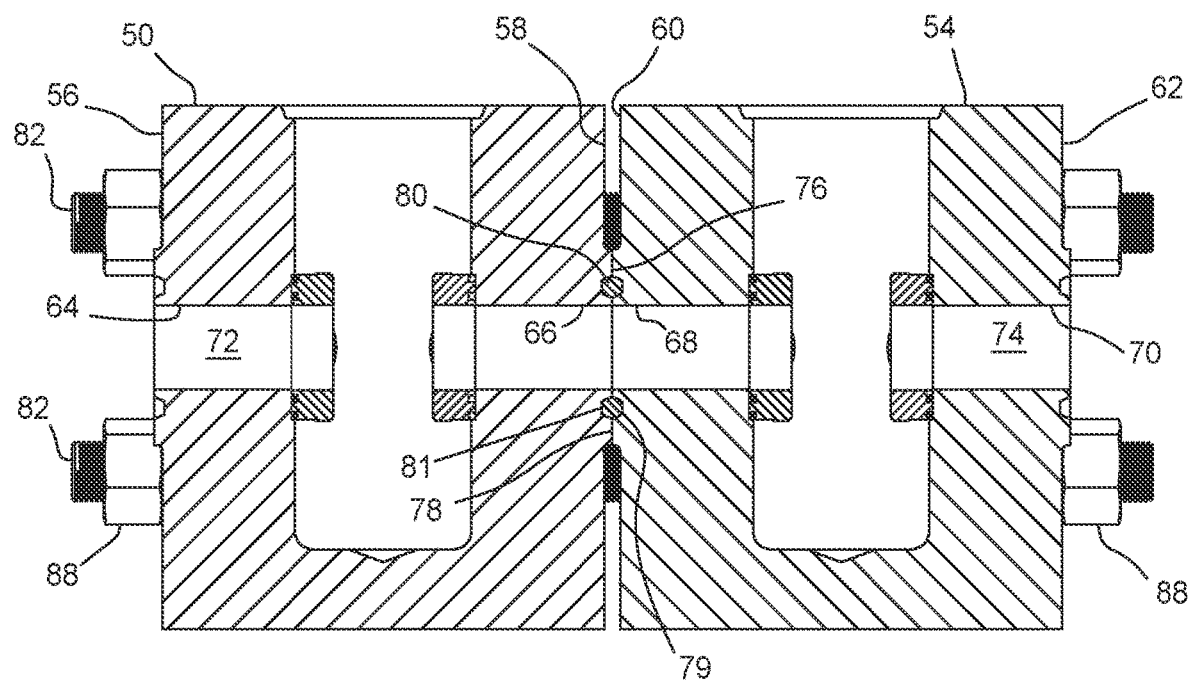
FIGS. 2B and 2C show cross sectional views of the embodiment depicted in FIG. 2A.
Figure 2C:
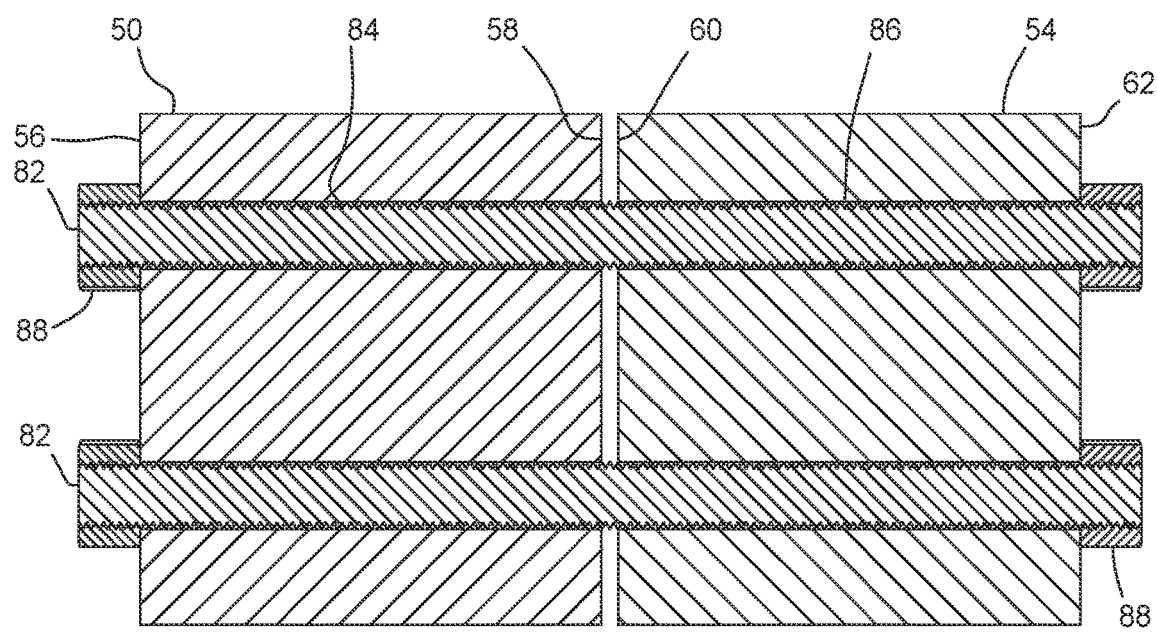

FIGS. 1A-B show an embodiment of a fluid conduit connector 2 of a fluid conduit connector system (46, FIGS. 2A-C). The fluid conduit connector 2 has a body 4. Although the body 4 may include a plurality of components, in some embodiments the body 4 may be monolithic. The body 4 may be cast as a single block. The body 4 may be machined out of a single block. In some embodiments, the body 4 may form at least part of a valve body. In such embodiments, the valve body may contain one or more valve components. The body 4 may have a first side 6 and a second side 8. The second side 8 may be opposite to the first side 6. The first side 6 may have a first opening 10, and the second side 8 may have a second opening 12. A throughbore 14 may extend from the first opening 10 to the second opening 12. The throughbore 14 may be configured to convey a fluid between the first side 6 and the second side 8.

The first side 6 may have a first sealing surface 16. The first sealing surface 16 may surround the first opening 10. The first sealing surface 16 may be recessed into the first side 6. The first sealing surface 16 may be recessed into a raised face 18 surrounding the first opening 10. The raised face 18 may be sized in accordance with a raised face of a standard ring type joint flange. The second side 8 may have a second sealing surface 20. The second sealing surface 20 may surround the second opening 12. The second sealing surface 20 may be recessed into the second side 8. The second sealing surface 20 may be recessed into a raised face 22 surrounding the second opening 12. The raised face 22 may be sized in accordance with a raised face of a standard ring type joint flange.

The first side 6 may have a first array 24 of holes 26. The first array 24 of holes 26 may be positioned around the first opening 10. As shown, the first array 24 has eight holes symmetrically positioned around the first opening 10, however, the holes 26 of the first array 24 of holes 26 may number, be sized, and be arranged in a pattern that substantially matches a number, size, and pattern of holes on a flange. For example, the number, size and pattern of holes 26 of the first array 24 of holes 26 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 may terminate within the body 4. In some embodiments, each hole 26 of the first array 24 of holes 26 may not terminate within the body 4. In some embodiments, selected holes 26 of the first array 24 of holes 26 may terminate within the body 4, and other holes 26 of the first array 24 of holes 26 may extend through the body 4. In some embodiments, those holes 26 of the first array 24 of holes 26 that extend through the body 4 may extend through the body 4 to the second side 8 of the body 4.

In some embodiments, each hole 26 of the first array 24 of holes 26 may be threaded. In some embodiments, each hole 26 of the first array 24 of holes 26 may not be threaded. In some embodiments, selected holes 26 of the first array 24 of holes 26 may be threaded, and other holes 26 of the first array 24 of holes 26 may not be threaded. In some embodiments, those holes 26 of the first array 24 of holes 26 that are threaded may be threaded along a portion of a length of each hole 26.

Figure 3A:
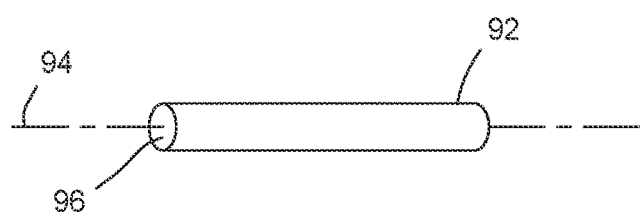
FIG. 3A shows a connection stud for a flange.

In some embodiments, each hole 26 of the first array 24 of holes 26 may be configured to receive a corresponding connection stud 92 (FIG. 3A). In some embodiments, each hole 26 of the first array 24 of holes 26 may be configured to receive a corresponding connection stud 92 whereby the corresponding connection stud 92 may be threaded into the respective hole 26 of the first array 24 of holes 26 to form a threaded connection. The threaded connection may be tightened in order to secure a component, such as a flange, to the body 4.

The first side 6 may have a second array 28 of holes 30. As shown, the second array 28 has four holes although any number of holes 30 may be used. The second array 28 of holes 30 may be positioned around the first array 24 of holes 26. For example, the second array 28 of holes 30 may include first 32 and second 34 groups of holes 30, and the first array 24 of holes 26 may be positioned between the first 32 and second 34 groups of holes 30 of the second array 28 of holes 30.

In some embodiments, each hole 30 of the second array 28 of holes 30 may terminate within the body 4. In some embodiments, each hole 30 of the second array 28 of holes 30 may not terminate within the body 4. In some embodiments, selected holes 30 of the second array 28 of holes 30 may terminate within the body 4, and other holes 30 of the second array 28 of holes 30 may extend through the body 4. In some embodiments, those holes 30 of the second array 28 of holes 30 that extend through the body 4 may extend through the body 4 to the second side 8 of the body 4.

In some embodiments, each hole 30 of the second array 28 of holes 30 may be threaded. In some embodiments, each hole 30 of the second array 28 of holes 30 may not be threaded. In some embodiments, selected holes 30 of the second array 28 of holes 30 may be threaded, and other holes 30 of the second array 28 of holes 30 may not be threaded. In some embodiments, those holes 30 of the second array 28 of holes 30 that are threaded may be threaded along a portion of a length of each hole 30.

The second side 8 may have a third array 36 of holes 38. In some embodiments, the third array 36 of holes 38 may be omitted. If present, the third array 36 of holes 38 may be positioned around the second opening 12. As shown, the third array 36 has eight holes symmetrically positioned around the second opening 12, however, the holes 38 of the third array 36 of holes 38 may number, be sized, and arranged in a pattern that substantially matches a number, size, and pattern of holes on a flange. For example, the number, size, and pattern of holes 38 of the third array 36 of holes 38 may be arranged to substantially match the number, size, and pattern of holes of a flange that meets one or more specifications of one or more of the American Petroleum Institute (API), the American National Standards Institute (ANSI), or the American Society of Mechanical Engineers (ASME).

In some embodiments, each hole 38 of the third array 36 of holes 38 may terminate within the body 4. In some embodiments, each hole 38 of the third array 36 of holes 38 may be threaded. In some embodiments, each hole 38 of the third array 36 of holes 38 may not be threaded. In some embodiments, selected holes 38 of the third array 36 of holes 38 may be threaded, and other holes 38 of the third array 36 of holes 38 may not be threaded. In some embodiments, those holes 38 of the third array 36 of holes 38 that are threaded may be threaded along a portion of a length of each hole 38.

In some embodiments, each hole 38 of the third array 36 of holes 38 may be configured to receive a corresponding connection stud 92. In some embodiments, each hole 38 of the third array 36 of holes 38 may be configured to receive a corresponding connection stud 92 whereby the corresponding connection stud 92 may be threaded into the respective hole 38 of the third array 36 of holes 38 to form a threaded connection. The threaded connection may be tightened in order to secure a component, such as a flange, to the body 4.

In embodiments in which each hole 30, or a selected number of holes 30, of the second array 28 of holes 30 extend to the second side 8 of the body 4, the second array 28 of holes 30 may be positioned around the third array 36 of holes 38 (if present). For example, the second array 28 of holes 30 may include third 40 and fourth 42 groups of holes 30 as seen on the second side 8, and the first array 24 of holes 26 may be positioned between the third 40 and fourth 42 groups of holes 30 of the second array 28 of holes 30. In some embodiments, the third 40 and fourth 42 groups of holes 30 of the second array 28 of holes 30 as seen on the second side 8 may correspond, respectively, with the first 32 and second 34 groups of holes 30 of the second array 28 of holes 30 on the first side 6 of the body 4.

As illustrated in FIGS. 1A-B, the fluid conduit connector 2 may be configured as a valve. One or more components 44 of the valve may be connected to the body 4.

FIGS. 2A-C show a fluid conduit connector system 46 in which two fluid conduit connectors of the embodiment of FIGS. 1A-B are coupled together as an assembly. FIG. 2A is an external view of the assembly, FIG. 2B is a longitudinal cross section along line 2B-2B, and FIG. 2C is a longitudinal cross section through the assembly along line 2C-2C. For clarity, the valve components 44 depicted in FIGS. 1A-B have been omitted.

As illustrated, a first fluid conduit connector 48 has a first body 50 that may also function as a valve body, and a second fluid conduit connector 52 has a second body 54 that may also function as a valve body. The first body 50 and second body 54 each have first sides 56, 60 and second sides 58, 62. Each first side 56, 60 has a first opening 64, 68, and each second side 58, 62 has a second opening 66, 70. Each of the first body 50 and second body 54 has a throughbore 72, 74 that extends between the respective first openings 64, 68 and second openings 66, 70. FIG. 2B shows the first side 60 of the second body 54 positioned adjacent to and facing the second side 58 of the first body 50. The first opening 68 of the second body 54 is aligned with the second opening 66 of the first body 50. A raised face 76 on the first side 60 of the second body 54 is positioned adjacent to a raised face 78 on the second side 58 of the first body 50. As shown, the raised face 76 on the first side 60 of the second body 54 may contact the raised face 78 on the second side 58 of the first body 50. In some embodiments, the raised face 76 on the first side 60 of the second body 54 may not contact the raised face 78 on the second side 58 of the first body 50. A seal 80 is shown disposed in a recess 79 in the first side 60 of the second body 54 and in a recess 81 in the second side 58 of the first body 50.

FIGS. 2A-C show the first 48 and second 52 fluid conduit connectors joined together by connection rods 82. Each connection rod 82 extends through a corresponding hole 84 in the first body 50 and through a corresponding hole 86 in the second body 54. In some embodiments, each connection rod 82 may be threaded at one end. In some embodiments, each connection rod 82 may be threaded at both ends. In some embodiments, each connection rod 82 may be threaded along a portion of its length. In some embodiments, each connection rod 82 may be threaded along substantially the entire length. As illustrated, each connection rod 82 is secured in place by fasteners 88, such as nuts, at each end. In some embodiments, one end of at least one connection rod 82 may include a bolt head, thereby obviating the need for a separate fastener 88 at that end.

In some embodiments, the sizing and number of connection rods 82 provide for the connection between the first 48 and second 52 fluid conduit connectors to have a mechanical characteristic that meets or exceeds a standard for an equivalent flanged connection. For example, FIG. 2A shows the first side 56 of the first body 50 of the first fluid conduit connector 48 having a first array 24 of holes 26 positioned around the first opening 64. The holes 26 of the first array 24 of holes 26 may number, be sized, and be arranged in a pattern that substantially matches a number, size, and pattern of holes on a standard flange. The number, size, and pattern of holes 26 of the first array 24 of holes 26 may comply with specifications of one or more of the American Petroleum Institute (API), the American National Standards Institute (ANSI), or the American Society of Mechanical Engineers (ASME).

Figure 3B:
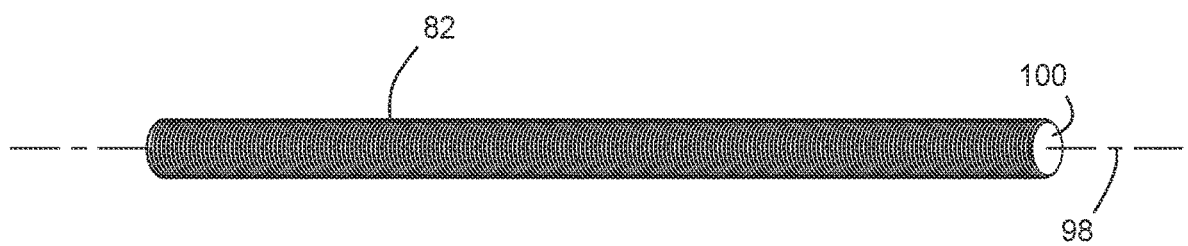
FIG. 3B shows a connection rod.

Each hole 26 of the first array 24 of holes 26 may be configured to receive a corresponding connection stud, such as the connection stud 92 depicted in FIG. 3A. Each connection stud 92 has a longitudinal axis 94 and a nominal cross sectional area 96 measured transverse to the longitudinal axis 94. In FIGS. 2A-C, the connection between the first fluid conduit connector 48 and the second fluid conduit connector 52 is effected by the connection rods 82, such as the connection rod 82 depicted in FIG. 3B. Each connection rod 82 has a longitudinal axis 98 and a nominal cross sectional area 100 measured transverse to the longitudinal axis. In some embodiments, the connection rod 82 nominal cross sectional area 100 multiplied by the total number of connection rods 82 used to connect two fluid conduit connectors together may be greater than, or equal to, the connection stud 92 nominal cross sectional area 96 multiplied by the total number of connection studs 92 that would be used in the first array 24 of holes 26 to secure a flange to the first conduit connector 48.

Figure 4:
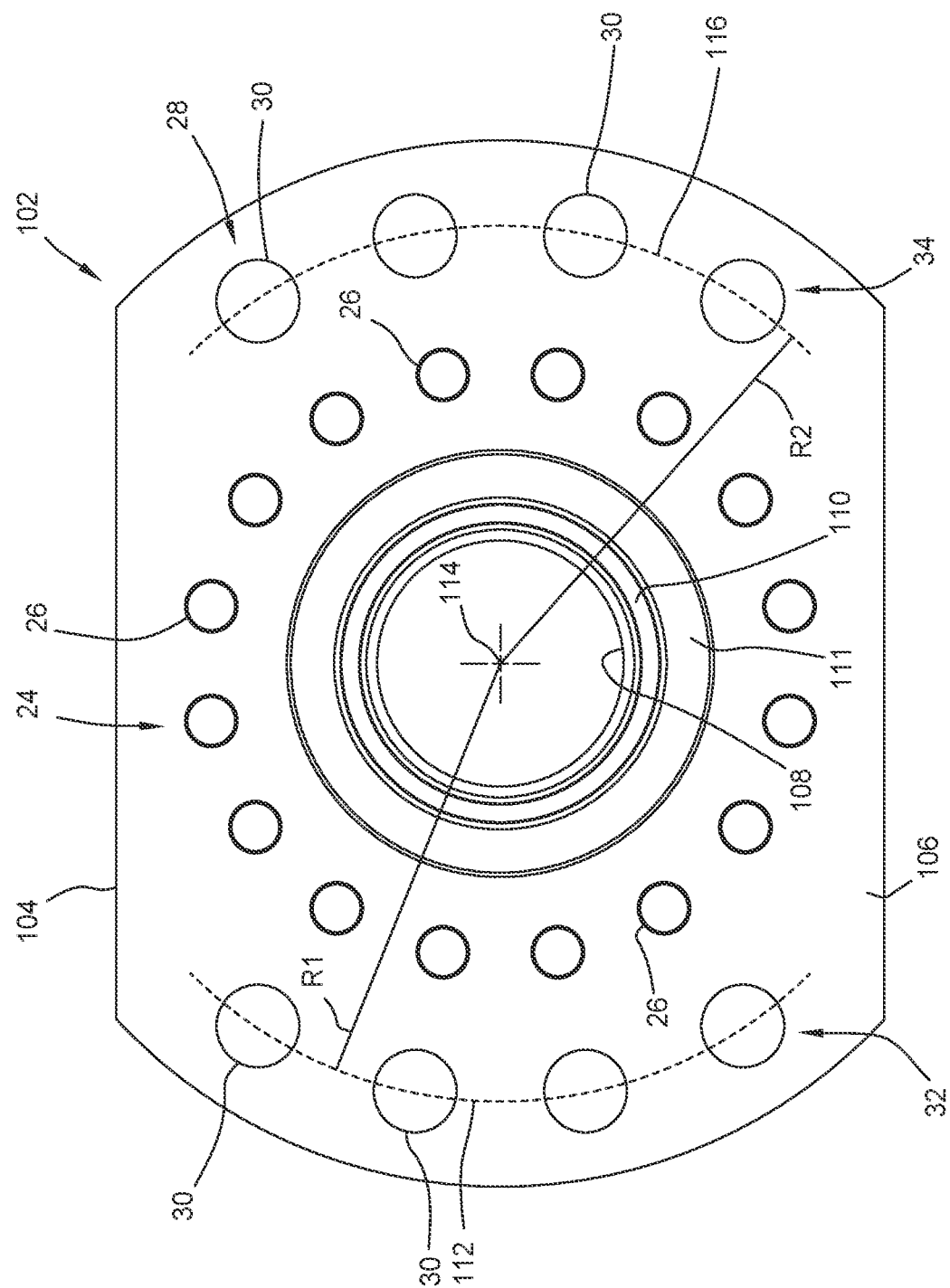
FIG. 4 shows another embodiment of a fluid conduit connector.

FIG. 4 is an end view of one embodiment of a fluid conduit connector, showing a side of the fluid conduit connector. The fluid conduit connector 102 has a body 104. Although the body 104 may include a plurality of components, in some embodiments the body 104 may be monolithic. The body 104 may be cast as a single block. The body 104 may be machined out of a single block. In some embodiments, the body 104 may form at least part of a valve body. In such embodiments, the valve body may contain one or more valve components. As shown in FIG. 4, the body 104 has a side 106 with an opening 108. A throughbore may extend from the opening 108 to an opposite side of the body 104. The throughbore may be configured to convey a fluid.

The side 106 may have a sealing surface 110. The sealing surface 110 may surround the opening 108. The sealing surface 110 may be recessed into the side 104. The sealing surface 110 may be recessed into a raised face 111 surrounding the opening 108. The raised face 111 may be sized in accordance with a raised face of a standard ring type joint flange.

The side may have a first array 24 of holes 26. The first array 24 of holes 26 may be positioned around the opening 108. As shown, the first array 24 has sixteen holes symmetrically positioned around the opening 108, however, the holes 26 of the first array 24 of holes 26 may number, be sized, and be arranged in a pattern that substantially matches a number, size, and pattern of holes on a flange. For example, the number, size and pattern of holes 26 of the first array 24 of holes 26 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 may terminate within the body 104. In some embodiments, each hole 26 of the first array 24 of holes 26 may not terminate within the body 104. In some embodiments, selected holes 26 of the first array 24 of holes 26 may terminate within the body 104, and other holes 26 of the first array 24 of holes 26 may extend through the body 104. In some embodiments, those holes 26 of the first array 24 of holes 26 that extend through the body 104 may extend through the body 104 to the opposite side of the body 104.

In some embodiments, each hole 26 of the first array 24 of holes 26 may be threaded. In some embodiments, each hole 26 of the first array 24 of holes 26 may not be threaded. In some embodiments, selected holes 26 of the first array 24 of holes 26 may be threaded, and other holes 26 of the first array 24 of holes 26 may not be threaded. In some embodiments, those holes 26 of the first array 24 of holes 26 that are threaded may be threaded along a portion of a length of each hole 26.

In some embodiments, each hole 26 of the first array 24 of holes 26 may be configured to receive a corresponding connection stud 92 (FIG. 3A). In some embodiments, each hole 26 of the first array 24 of holes 26 may be configured to receive a corresponding connection stud 92 whereby the corresponding connection stud 92 may be threaded into the respective hole 26 of the first array 24 of holes 26 to form a threaded connection. The threaded connection may be tightened in order to secure a component, such as a flange, to the body 104.

The side 106 may have a second array 28 of holes 30. As shown, the second array 28 has eight holes although any number of holes 30 may be used. The second array 28 of holes 30 may be positioned around the first array 24 of holes 26. For example, the second array 28 of holes 30 may include first 32 and second 34 groups of holes 30, and the first array 24 of holes 26 may be positioned between the first and second groups 32, 34 of holes 30 of the second array 28 of holes 30. As shown in FIG. 4, the holes 30 of the first group 32 of holes 30 may be aligned such that the holes 30 describe a first curve 112. The first curve 112 may have a radius R1 measured from a center 114 of the body 104. As shown in FIG. 4, the holes 30 of the second group 34 of holes 30 may be aligned such that the holes 30 describe a second curve 116. The second curve 116 may have a radius R2 measured from the center 114 of the body 104. In some embodiments, radius R1 is substantially equal to radius R2, such that radius R1 and radius R2 may be considered to be equal within the bounds of standard manufacturing tolerances. In some embodiments, radius R1 is not substantially equal to radius R2 such that radius R1 and radius R2 may be considered not to be equal within the bounds of standard manufacturing tolerances.

In some embodiments, each hole 30 of the second array 28 of holes 30 may terminate within the body 104. In some embodiments, each hole 30 of the second array 28 of holes 30 may not terminate within the body 104. In some embodiments, selected holes 30 of the second array 28 of holes 30 may terminate within the body 104, and other holes 30 of the second array 28 of holes 30 may extend through the body 104. In some embodiments, those holes 30 of the second array 28 of holes 30 that extend through the body 104 may extend through the body 104 to the opposite side of the body 104.

In some embodiments, each hole 30 of the second array 28 of holes 30 may be threaded. In some embodiments, each hole 30 of the second array 28 of holes 30 may not be threaded. In some embodiments, selected holes 30 of the second array 28 of holes 30 may be threaded, and other holes 30 of the second array 28 of holes 30 may not be threaded. In some embodiments, those holes 30 of the second array 28 of holes 30 that are threaded may be threaded along a portion of a length of each hole 30.

Figure 5A:
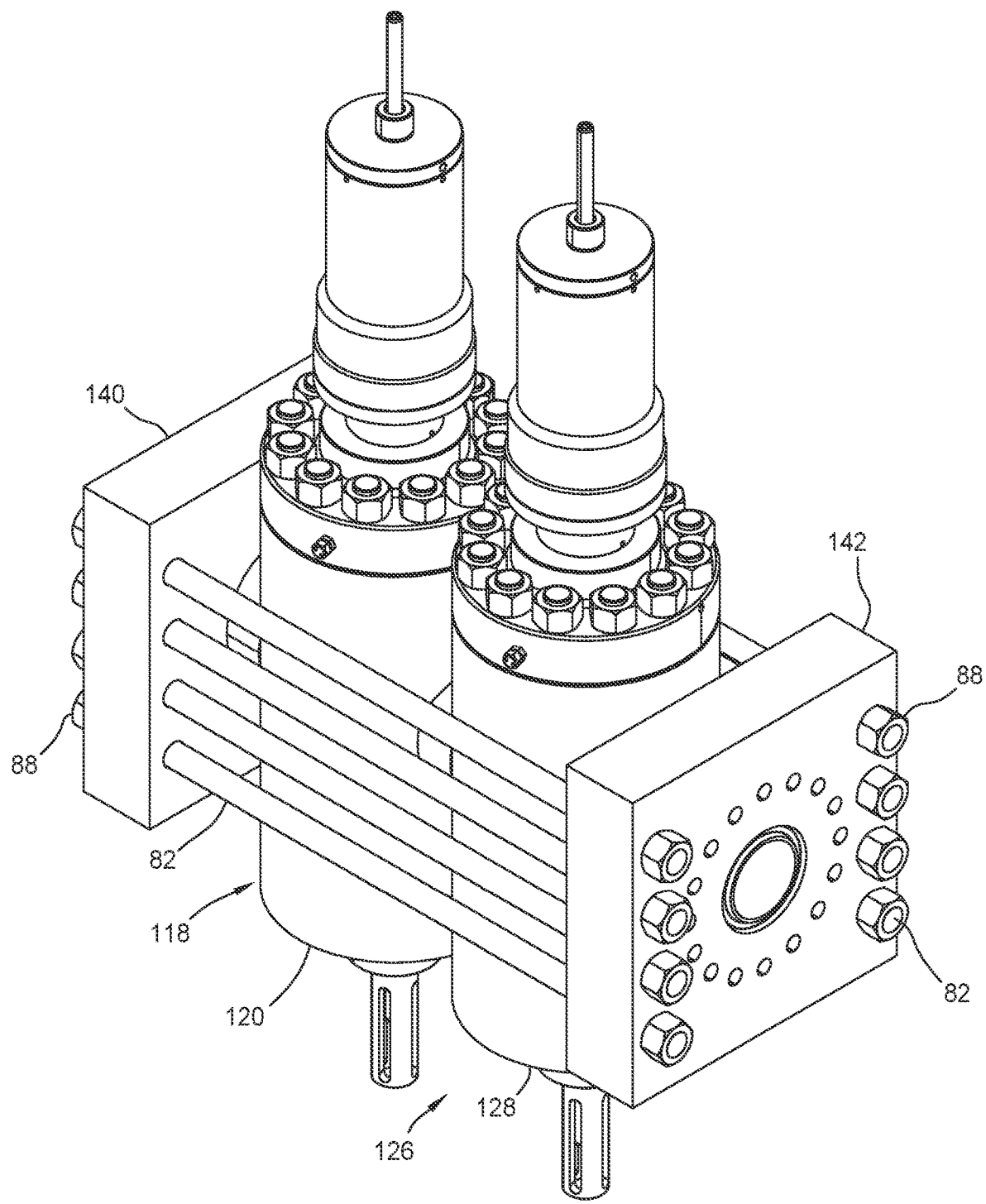
FIG. 5A shows an external view of another embodiment of a fluid conduit connector and a fluid conduit connector system.
Figure 5B:
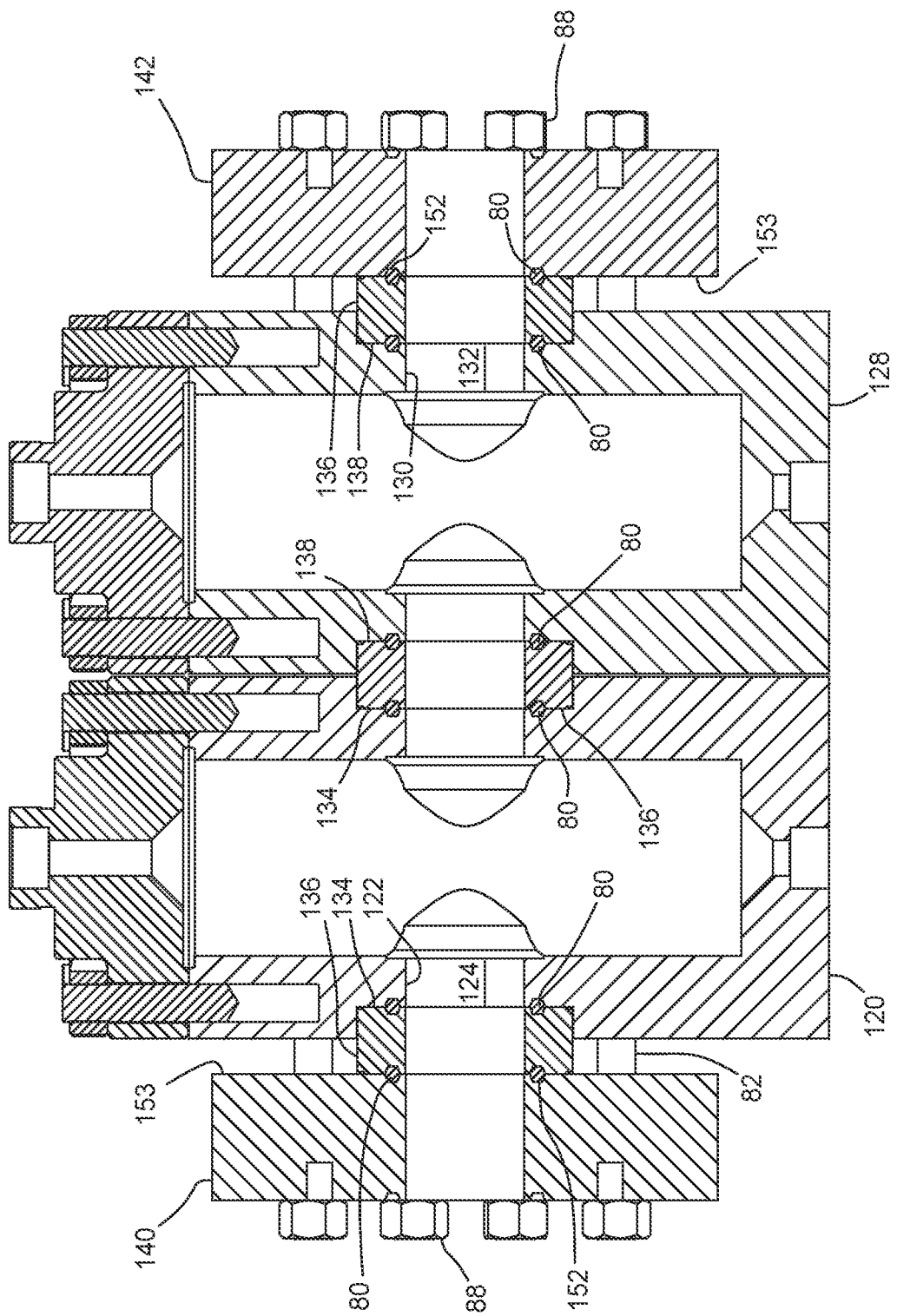
FIG. 5B shows a cross sectional view of the embodiment depicted in FIG. 5A.

FIGS. 5A-E illustrate another embodiment of a fluid conduit connector system. FIG. 5A provides an external view of two fluid conduit connectors coupled together as an assembly, and FIG. 5B is a cross section view of selected parts of the assembly. As shown in FIGS. 5A and 5B, a first fluid conduit connector 118 has a first body 120. Although the first body 120 may include a plurality of components, in some embodiments the first body 120 may be monolithic. The first body 120 may be cast as a single block. The first body 120 may be machined out of a single block. In some embodiments, the first body 120 may form at least part of a valve body. In such embodiments, the valve body may contain one or more valve components. As shown in FIG. 5B, the first body 120 has an opening 122 in one side, and a throughbore 124 may extend from the opening 122 to an opposite side of the first body 120. The throughbore 124 may be configured to convey a fluid.

A second fluid conduit connector 126 has a second body 128. Although the second body 128 may include a plurality of components, in some embodiments the second body 128 may be monolithic. The second body 128 may be cast as a single block. The second body 128 may be machined out of a single block. In some embodiments, the second body 128 may form at least part of a valve body. In such embodiments, the valve body may contain one or more valve components. As shown in FIG. 5B, the second body 128 has an opening 130 in one side, and a throughbore 132 may extend from the opening to an opposite side of the second body 128. The throughbore 132 may be configured to convey a fluid.

As shown in FIGS. 5A and 5B, the first body 120 is positioned adjacent to the second body 128 such that the throughbore 124 of the first body 120 is aligned with the throughbore 132 of the second body 128. The first body 120 may have one or more recess 134 configured to accept a seal unit 136. The second body 128 may have one or more recess 138 to accept a seal unit 136. As shown in FIG. 5B, the first and second bodies 120, 128 are positioned between first and second flange plates 140, 142. One or more seal unit 136 may be positioned between the first flange plate 140 and the first body 120, between the first body 120 and the second body 128, and between the second body 128 and the second flange plate 142. Each seal unit 136 may be disposed at least partially in a recess 134 of the first body 120 and/or a recess 138 of the second body 128. Thus, fluid leakage at interfaces between the first flange plate 140 and the first body 120, between the first body 120 and the second body 128, and between the second body 128 and the second flange plate 142 may be inhibited.

As shown in FIG. 5A, the first and second flange plates 140, 142 are coupled together by connection rods 82. The connection rods 82 are positioned through holes 30 in each of the first and second flange plates 140, 142, and secured by fasteners 88, such as nuts. As shown in FIG. 5A, the connection rods 82 do not extend through the first body 120 of the first fluid conduit connector 118. As shown in FIG. 5A, the connection rods 82 do not extend through the second body 128 of the second fluid conduit connector 126. In some embodiments, at least one connection rod 82 may extend through the first body 120 of the first fluid conduit connector 118. In some embodiments, at least one connection rod 82 may extend through the second body 128 of the second fluid conduit connector 126. In some embodiments, at least one connection rod 82 may extend through the first body 120 of the first fluid conduit connector 118 and the second body 128 of the second fluid conduit connector 126.

FIG. 5C shows an outer facing side of a flange plate 146, which may represent either or both of the first flange plate 140 and the second flange plate 142. An outer face 147 of the flange plate 146 may have an opening 148, and a throughbore 150 may extend from the opening 148 to an opposite, inner face of the flange plate 146. The throughbore 150 may be configured to convey a fluid.

The outer face 147 may have a sealing surface 152. The sealing surface 152 may surround the opening 148. The sealing surface 152 may be recessed into the outer face 147. The sealing surface 152 may be recessed into a raised face (not shown) surrounding the opening 148. The raised face may be sized in accordance with a raised face of a standard ring type joint flange. As shown in FIG. 5B, the inner face 153 of the flange plate 146 (140, 142) may have a sealing surface 152.

Returning to FIG. 5C, the outer face 147 may have a first array 24 of holes 26. The first array 24 of holes 26 may be positioned around the opening 148. As shown, the first array 24 has sixteen holes symmetrically positioned around the opening 148, however, the holes 26 of the first array 24 of holes 26 may number, be sized, and be arranged in a pattern that substantially matches a number, size, and pattern of holes on a flange. For example, the number, size and pattern of holes 26 of the first array 24 of holes 26 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 may terminate within the flange plate 146. In some embodiments, each hole 26 of the first array 24 of holes 26 may not terminate within the flange plate 146. In some embodiments, selected holes 26 of the first array 24 of holes 26 may terminate within the flange plate 146, and other holes 26 of the first array 24 of holes 26 may extend through the flange plate 146. In some embodiments, those holes 26 of the first array 24 of holes 26 that extend through the flange plate 146 may extend through to the inner face 153 of the flange plate 146.

In some embodiments, each hole 26 of the first array 24 of holes 26 may be threaded. In some embodiments, each hole 26 of the first array 24 of holes 26 may not be threaded. In some embodiments, selected holes 26 of the first array 24 of holes 26 may be threaded, and other holes 26 of the first array 24 of holes 26 may not be threaded. In some embodiments, those holes 26 of the first array 24 of holes 26 that are threaded may be threaded along a portion of a length of each hole 26.

In some embodiments, each hole 26 of the first array 24 of holes 26 may be configured to receive a corresponding connection stud 92. In some embodiments, each hole 26 of the first array 24 of holes 26 may be configured to receive a corresponding connection stud 92 whereby the corresponding connection stud 92 may be threaded into the respective hole 26 of the first array 24 of holes 26 to form a threaded connection. The threaded connection may be tightened in order to secure a component, such as a flange, to the flange plate 146.

The outer face 147 may have a second array 28 of holes 30. As shown, the second array 28 has eight holes although any number of holes 30 may be used. The second array 28 of holes 30 may be positioned around the first array 24 of holes 26. For example, the second array 28 of holes 30 may include first and second groups 32, 34 of holes, and the first array 24 of holes 26 may be positioned between the first and second groups 32, 34 of holes 30 of the second array 28 of holes 30. In some embodiments, each hole 30 of the second array 28 of holes 30 may terminate within the flange plate 146. In some embodiments, each hole 30 of the second array 28 of holes 30 may not terminate within the flange plate 146. In some embodiments, selected holes 30 of the second array 28 of holes 30 may terminate within the flange plate 146, and other holes 30 of the second array 28 of holes 30 may extend through the flange plate 146. In some embodiments, those holes 30 of the second array 28 of holes 30 that extend through the flange plate 146 may extend through the body to the inner face 147 of the flange plate 146.

In some embodiments, each hole 30 of the second array 28 of holes 30 may be threaded. In some embodiments, each hole 30 of the second array 28 of holes 30 may not be threaded. In some embodiments, selected holes 30 of the second array 28 of holes 30 may be threaded, and other holes 30 of the second array 28 of holes 30 may not be threaded. In some embodiments, those holes 30 of the second array 28 of holes 30 that are threaded may be threaded along a portion of a length of each hole 30.

FIGS. 5D and 5E illustrate a seal unit 136 in perspective and cross sectional views, respectively. The seal unit 136 may be formed as an annular element including a first face 154 having a first opening 156, an opposite second face 158 having a second opening 160, and a throughbore 161 extending between the first and second openings 156, 160. A first sealing surface 162 may surround the first opening 156. The first sealing surface 162 may be recessed into the first face 154. A second sealing surface 164 may surround the second opening 160. The second sealing surface 164 may be recessed into the second face 158. As shown in FIG. 5B, one or more seal 80 may be disposed against the first sealing surface 162, and one or more seal 80 may be disposed against the second sealing surface 164. The one or more seal 80 may be configured to be in sealing contact with a complementary sealing surface, such as the sealing surface 152 of the inner face 153 of a flange plate 140, 142, 146 or a sealing surface of the first body 120 or second body 128.

Figure 6A:
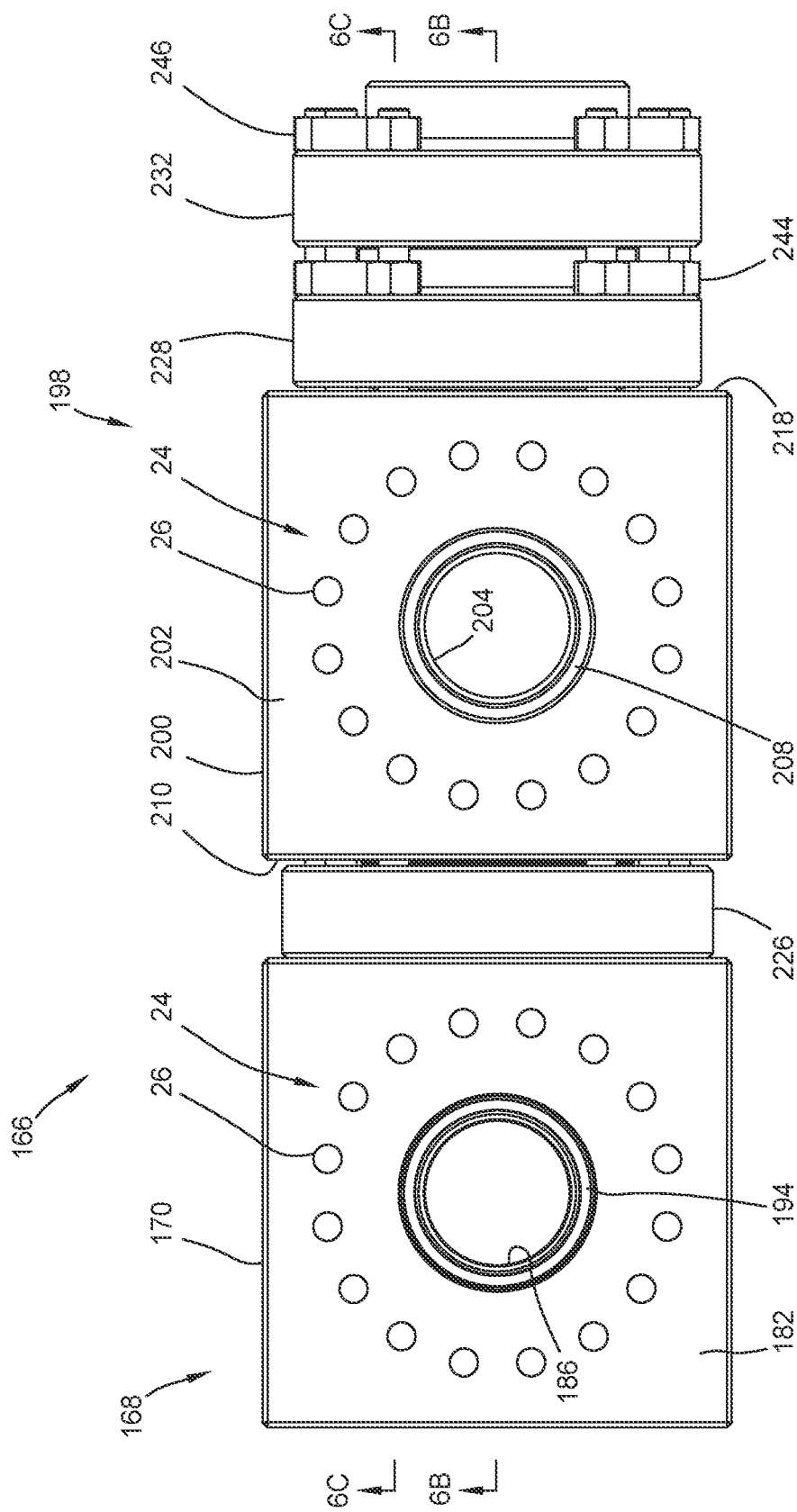
FIG. 6A shows an external view of another embodiment of a fluid conduit connector and a fluid conduit connector system.
Figure 6B:
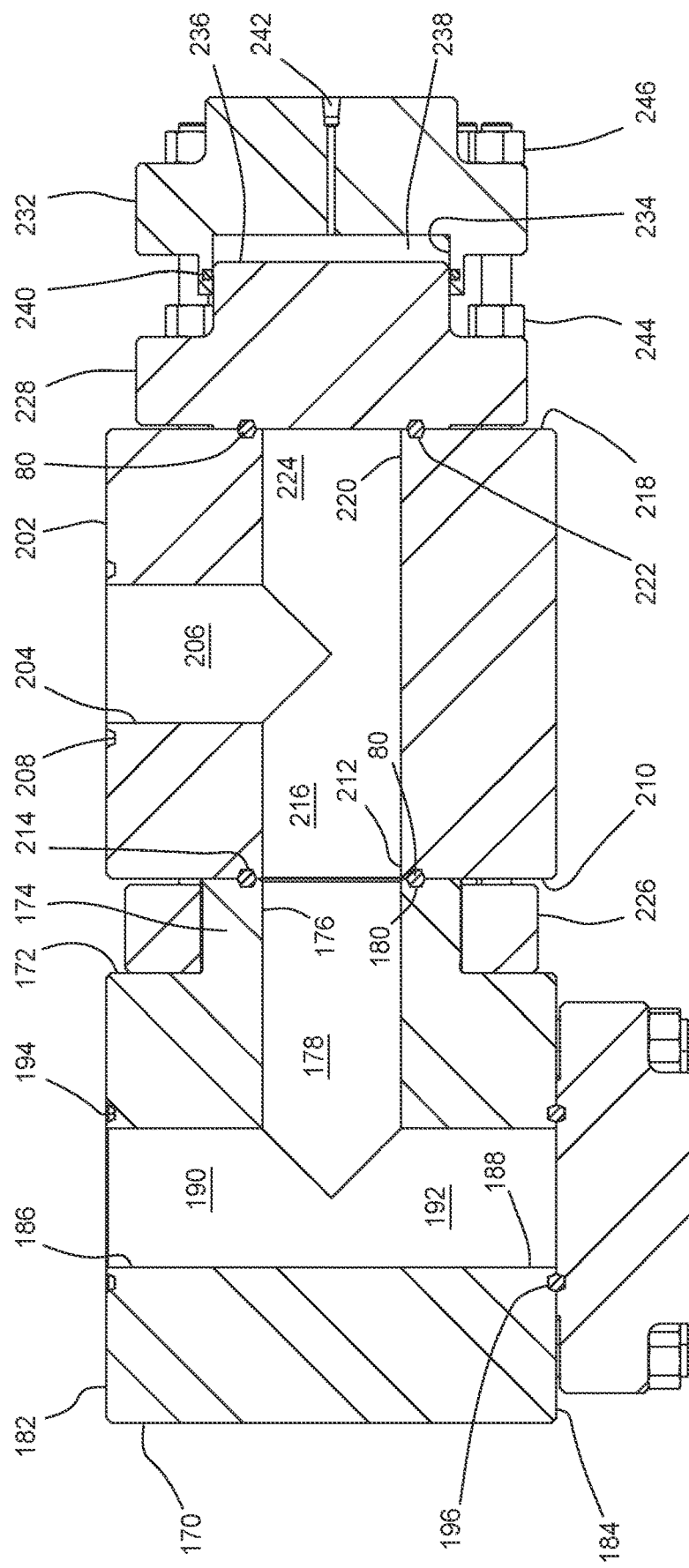
FIGS. 6B and 6C show cross sectional views of the embodiment depicted in FIG. 6A.
Figure 6C:
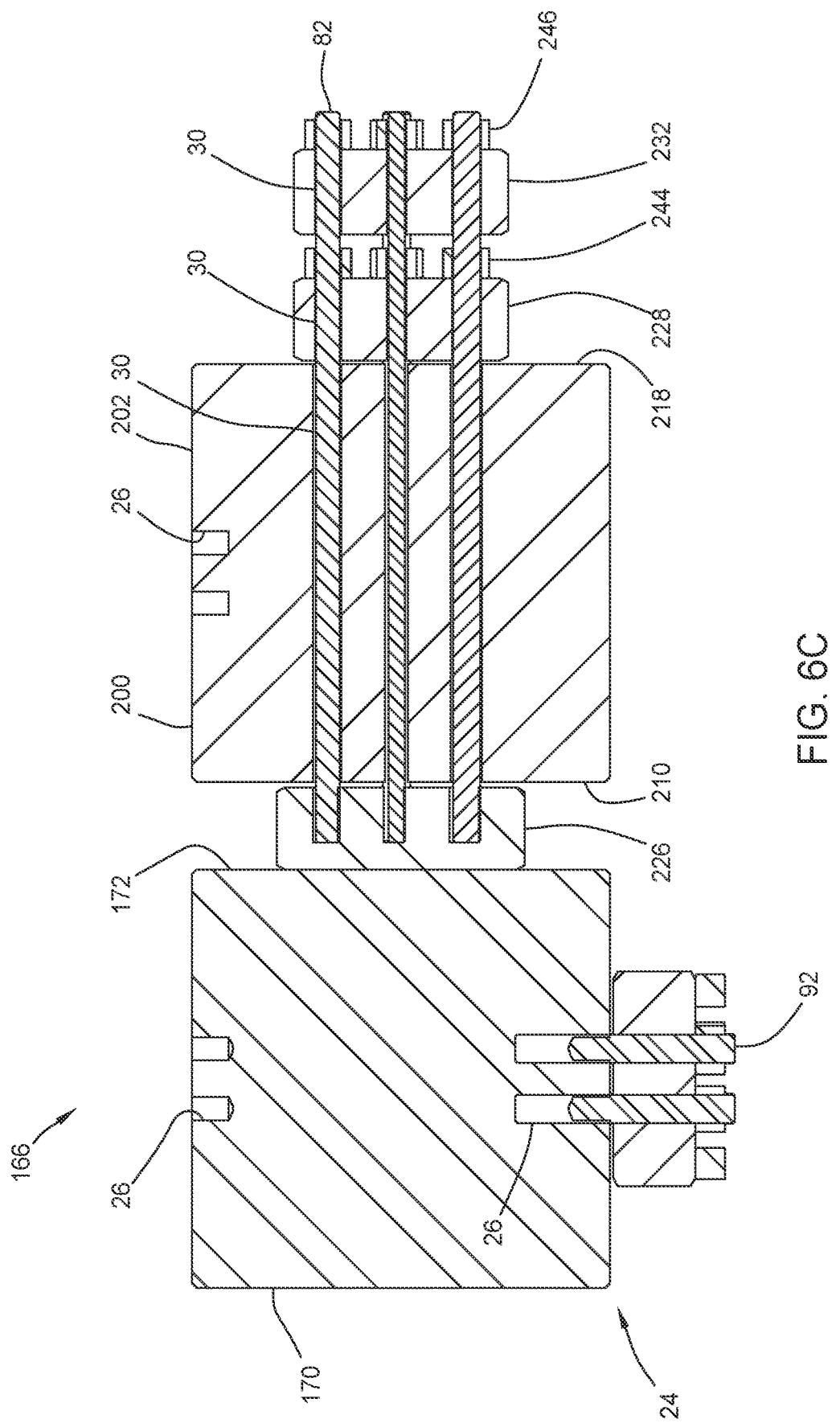

FIGS. 6A-C illustrate another embodiment of a fluid conduit connector system. FIG. 6A is a side view of an assembled exemplary fluid conduit connector system 166, and FIGS. 6B and 6C are longitudinal cross sections taken across lines 6B-6B and 6C-6C, respectively. As further described below, the fluid conduit connector system 166 provides a versatile arrangement to quickly connect and disconnect different fluid conduits and/or valve assemblies, such as two different fracture trees, that may be located at different horizontal and/or vertical positions relative to each other. One or more fluid conduit connection systems 166 may be connected together via one or more fluid conduits to form the fluid conduit connector system.

A first fluid conduit connector 168 may include a first body 170 having a first side 172. A neck 174 may extend from the first side 172. The neck 174 may have a first opening 176, and a first bore 178 may extend from the first opening 176 into the first body 170. The neck 174 may have a first sealing surface 180. The first sealing surface 180 may surround the first opening 176. The first sealing surface 180 may be recessed into the neck 174. The first sealing surface 180 may be recessed into a raised face surrounding the first opening 176. The raised face may be sized in accordance with a raised face of a standard ring type joint flange.

The first body 170 may have second and third sides 182, 184. The second and third sides 182, 184 may be substantially perpendicular to the first side 172. In some embodiments, at least one of the second and third sides 182, 184 may not be substantially perpendicular to the first side 172. In some embodiments, the second side 182 may have a neck similar to the neck 174 of the first side 172. In some embodiments, the third side 184 may have a neck similar to the neck 174 of the first side 172. The second side 182 may have a second opening 186. The third side 184 may have a third opening 188. A second bore 190 may extend from the second opening 186 into the first body 170. The second bore 190 may intersect with the first bore 178. A third bore 192 may extend from the third opening 188 into the first body 170. The third bore 192 may intersect with the first bore 178. The second bore 190 may intersect with the third bore 192.

The second side 182 of the first body 170 may have a second sealing surface 194. The second sealing surface 194 may surround the second opening 186. The second sealing surface 194 may be recessed into the second side 182. The second sealing surface 194 may be recessed into a raised face surrounding the second opening 186. The raised face may be sized in accordance with a raised face of a standard ring type joint flange.

As shown in FIG. 6A, the second side 182 of the first body 170 may have a first array 24 of holes 26. The first array 24 of holes 26 of the second side 182 of the first body 170 may be positioned around the second opening 186. As shown, the first array 24 has sixteen holes symmetrically positioned around the opening 186, however, the holes 26 of the first array 24 of holes 26 of the second side 182 of the first body 170 may number, be sized, and be arranged in a pattern that substantially matches a number, size, and pattern of holes on a flange. For example, the number, size and pattern of holes 26 of the first array 24 of holes 26 of the second side 182 of the first body 170 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 of the second side 182 of the first body 170 may terminate within the first body 170. In some embodiments, each hole 26 of the first array 24 of holes 26 of the second side 182 of the first body 170 may not terminate within the first body 170. In some embodiments, selected holes 26 of the first array 24 of holes 26 of the second side 182 of the first body 170 may terminate within the first body 170, and other holes 26 of the first array 24 of holes 26 of the second side 182 of the first body 170 may extend through the first body 170. In some embodiments, those holes 26 of the first array 24 of holes 26 of the second side 182 of the first body 170 that extend through the first body 170 may extend through the first body 170 to the third side 184 of the first body 170.

In some embodiments, each hole 26 of the first array 24 of holes 26 of the second side 182 of the first body 170 may be threaded. In some embodiments, each hole 26 of the first array 24 of holes 26 of the second side 182 of the first body 170 may not be threaded. In some embodiments, selected holes 26 of the first array 24 of holes 26 of the second side 182 of the first body 170 may be threaded, and other holes 26 of the first array 24 of holes 26 of the second side 182 of the first body 170 may not be threaded. In some embodiments, those holes 26 of the first array 24 of holes 26 of the second side 182 of the first body 170 that are threaded may be threaded along a portion of a length of each hole.

In some embodiments, each hole 26 of the first array 24 of holes 26 of the second side 182 of the first body 170 may be configured to receive a corresponding connection stud 92. In some embodiments, each hole 26 of the first array 24 of holes 26 of the second side 182 of the first body 170 may be configured to receive a corresponding connection stud 92 whereby the corresponding connection stud 92 may be threaded into the respective hole 26 of the first array 24 of holes 26 of the second side 182 of the first body 170 to form a threaded connection. The threaded connection may be tightened in order to secure a component, such as a flange, to the first body 170.

Additionally, or alternatively, the second side 182 of the first body 170 may have a second array of holes, such as the second array 28 of holes 30 of FIGS. 1A-B, or the second array 28 of holes 30 of FIG. 4. In some embodiments, the second array of holes may extend through the first body 170 to the third side 184.

The third side 184 of the first body 170 may have a third sealing surface 196. The third sealing surface 196 may surround the third opening 188. The third sealing surface 196 may be recessed into the third side 184 of the first body 170. The third sealing surface 196 may be recessed into a raised face surrounding the third opening 188. The raised face may be sized in accordance with a raised face of a standard ring type joint flange.

The third side 184 of the first body 170 may have a first array 24 of holes 26. The first array 24 of holes 26 of the third side 184 of the first body 170 may be positioned around the third opening 188. As shown, the first array 24 has sixteen holes symmetrically positioned around the third opening 188, however, the holes 26 of the first array 24 of holes 26 of the third side 184 of the first body 170 may number, be sized, and be arranged in a pattern that substantially matches a number, size, and pattern of holes on a flange. For example, the number, size and pattern of holes 26 of the first array 24 of holes 26 of the third side 184 of the first body 170 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 of the third side 184 of the first body 170 may terminate within the first body 170. In some embodiments, each hole 26 of the first array 24 of holes 26 of the third side 184 of the first body 170 may not terminate within the first body 170. In some embodiments, selected holes 26 of the first array 24 of holes 26 of the third side 184 of the first body 170 may terminate within the first body 170, and other holes 26 of the first array 24 of holes 26 of the third side 184 of the first body 170 may extend through the first body 170. In some embodiments, those holes 26 of the first array 24 of holes 26 of the third side 184 of the first body 170 that extend through the first body 170 may extend through the first body 170 to the second side 182 of the first body 170.

In some embodiments, each hole 26 of the first array 24 of holes 26 of the third side 184 of the first body 170 may be threaded. In some embodiments, each hole 26 of the first array 24 of holes 26 of the third side 184 of the first body 170 may not be threaded. In some embodiments, selected holes 26 of the first array 24 of holes 26 of the third side 184 of the first body 170 may be threaded, and other holes 26 of the first array 24 of holes 26 of the third side 184 of the first body 170 may not be threaded. In some embodiments, those holes 26 of the first array 24 of holes 26 of the third side 184 of the first body 170 that are threaded may be threaded along a portion of a length of each hole 26.

In some embodiments, each hole 26 of the first array 24 of holes 26 of the third side 184 of the first body 170 may be configured to receive a corresponding connection stud 92. In some embodiments, each hole 26 of the first array 24 of holes 26 of the third side 184 of the first body 170 may be configured to receive a corresponding connection stud 92 whereby the corresponding connection stud 92 may be threaded into the respective hole 26 of the first array 24 of holes 26 of the third side 184 of the first body 170 to form a threaded connection. The threaded connection may be tightened in order to secure a component, such as a flange, to the first body 170.

Additionally, or alternatively, the third side 184 of the first body 170 may have a second array of holes, such as the second array 28 of holes 30 of FIGS. 1A-B, or the second array 28 of holes 30 of FIG. 4. In some embodiments, the second array of holes may extend through the first body 170 to the second side 182 of the first body 170.

As shown in FIGS. 6A-C, the fluid conduit connector system 166 may have a second fluid conduit connector 198. The second fluid conduit connector 198 may have a second body 200. The second body 200 may be configured similarly to the first body 170 of the first fluid conduit connector 168. Thus, the second body 200 may have a first side 202 with a first opening 204, a first sealing surface 208 surrounding the first opening 204, and a first bore 206. In some embodiments, a neck may extend from the first side 202, and the neck may have the first opening 204 and the first sealing surface 208. In embodiments in which the first side 202 of the second body 200 has a neck, the first sealing surface 208 may be recessed into the neck. In embodiments in which the first side 202 of the second body 200 does not have a neck, the first sealing surface 208 may be recessed into the first side 202 of the second body 200. In some embodiments, the first sealing surface 208 may be recessed into a raised face surrounding the first opening 204. The raised face may be sized in accordance with a raised face of a standard ring type joint flange.

In embodiments in which the first side 202 of the second body 200 does not have a neck, the first side 202 of the second body 200 may have a first array 24 of holes 26. The first array 24 of holes 26 of the first side 202 of the second body 200 may be positioned around the first opening 204. The holes 26 of the first array 24 of holes 26 of the first side 202 of the second body 200 may number, be sized, and be arranged in a pattern that substantially matches a number, size, and pattern of holes on a flange. For example, the number, size and pattern of holes 26 of the first array 24 of holes 26 of the first side 202 of the second body 200 may be arranged to substantially match the hole number, size and pattern of holes of a flange that meets one or more specifications of one or more of the American Petroleum Institute (API), the American National Standards Institute (ANSI), or the American Society of Mechanical Engineers (ASME).

In some embodiments, each hole 26 of the first array 24 of holes 26 of the first side 202 of the second body 200 may terminate within the second body 200. In some embodiments, each hole 26 of the first array 24 of holes 26 of the first side 202 of the second body 200 may not terminate within the second body 200. In some embodiments, selected holes 26 of the first array 24 of holes 26 of the first side 202 of the second body 200 may terminate within the second body 200, and other holes 26 of the first array 24 of holes 26 of the first side 202 of the second body 200 may extend through the second body 200. In some embodiments, those holes 26 of the first array 24 of holes 26 of the first side 202 of the second body 200 that extend through the second body 200 may extend through the second body 200 to an opposite side of the second body 200.

In some embodiments, each hole 26 of the first array 24 of holes 26 of the first side 202 of the second body 200 may be threaded. In some embodiments, each hole 26 of the first array 24 of holes 26 of the first side 202 of the second body 200 may not be threaded. In some embodiments, selected holes 26 of the first array 24 of holes 26 of the first side 202 of the second body 200 may be threaded, and other holes 26 of the first array 24 of holes 26 of the first side 202 of the second body 200 may not be threaded. In some embodiments, those holes 26 of the first array 24 of holes 26 of the first side 202 of the second body 200 that are threaded may be threaded along a portion of a length of each hole 26.

In some embodiments, each hole 26 of the first array 24 of holes 26 of the first side 202 of the second body 200 may be configured to receive a corresponding connection stud 92. In some embodiments, each hole 26 of the first array 24 of holes 26 of the first side 202 of the second body 200 may be configured to receive a corresponding connection stud 92 whereby the corresponding connection stud 92 may be threaded into the respective hole 26 of the first array 24 of holes 26 of the first side 202 of the second body 200 to form a threaded connection. The threaded connection may be tightened in order to secure a component, such as a flange, to the second body 200.

Additionally, or alternatively, the first side 202 of the second body 200 may have a second array of holes, such as the second array 28 of holes 30 of FIGS. 1A-B, or the second array 28 of holes 30 of FIG. 4. In some embodiments, the second array of holes may extend through the second body 200 to an opposite side of the second body 200.

The second body 200 may have a second side 210 with a second opening 212, a second sealing surface 214 surrounding the second opening 212, and a second bore 216. In some embodiments, a neck may extend from the second side 210, and the neck may have the second opening 212 and the second sealing surface 214. In embodiments in which the second side 210 of the second body 200 has a neck, the second sealing surface 214 may be recessed into the neck. In embodiments in which the second side 210 of the second body 200 does not have a neck, the second sealing surface 214 may be recessed into the second side 210 of the second body 200. In some embodiments, the second sealing surface 214 may be recessed into a raised face surrounding the second opening 212. The raised face may be sized in accordance with a raised face of a standard ring type joint flange.

The second body 200 may have a third side 218 with a third opening 220, a third sealing surface 222 surrounding the third opening 220, and a third bore 224. In some embodiments, a neck may extend from the third side 218, and the neck may have the third opening 220 and the third sealing surface 222. In embodiments in which the third side 218 of the second body 200 has a neck, the third sealing surface 222 may be recessed into the neck. In embodiments in which the third side 218 of the second body 200 does not have a neck, the third sealing surface 222 may be recessed into the third side 218 of the second body 200. In some embodiments, the third sealing surface 222 may be recessed into a raised face surrounding the third opening 220. The raised face may be sized in accordance with a raised face of a standard ring type joint flange.

In some embodiments, the second body 200 may have a third side 218 that omits the third opening 220. In some embodiments, the second body 200 may omit the third bore 224.

The second bore 216 of the second body 200 may intersect with the first bore 206 of the second body 200. If present, the third bore 224 of the second body 200 may intersect with the second bore 216 of the second body 200. If present, the third bore 224 of the second body 200 may intersect with the first bore 206 of the second body 200. As shown in FIG. 6B, the second bore 216 of the second body 200 may be aligned with and intersect the third bore 224 of the second body 200 such that there exists a throughbore from the second opening 212 to the third opening 220. As shown in FIG. 6B, the first bore 206 of the second body 200 may intersect with the throughbore.

As shown in FIGS. 6A-C, The first body 170 of the first fluid conduit connector 168 may be coupled to the second body 200 of the second fluid conduit connector such that the neck 174 of the first side 172 of the first body 170 may be disposed adjacent to the second side 210 of the second body 200. The first bore 178 of the first body 170 may be aligned with the second bore 216 of the second body 200. A seal 80 may be disposed against the first sealing surface 208 of the first side 172 of the first body 170 and against the second sealing surface 214 of the second side 210 of the second body 200.

A tension flange 226 may be disposed around the neck 174 of the first side 172 of the first body 170. The tension flange 226 may be threadedly coupled to the neck 174. Additionally, or alternatively, the tension flange 226 may be coupled to the neck 174 by one or more fastenings, such as screws, latches, clasps, and the like. In some embodiments, as shown in FIG. 6B, the tension flange 226 may be coupled to the neck 174 such that an end of the neck 174 protrudes through the tension flange 226.

A connection flange 228 may be disposed on the third side 218 of the second body 200. The connection flange 228 may be a blind flange. A seal 80 may be disposed against the third sealing surface 222 of the third side 218 of the second body 200 and against a sealing surface 230 of the connection flange 228. A piston flange 232 may be disposed on the connection flange 228. The piston flange 232 may include a recess 234. The connection flange 228 may have a piston head 236 disposed in the recess 234. A chamber 238 may be defined at least in part by the connection flange 228 and the piston flange 232. The chamber 238 may be defined at least in part by the recess 234 and the piston head 236. A seal 240 may inhibit passage of fluid between the chamber 238 and an exterior of the piston flange 232. The piston flange 232 may have a port 242 that fluidically couples the chamber 238 with an exterior of the piston flange 232. The port 242 may include a pressure fitting to enable a source of hydraulic pressure to be coupled to the port 242.

In some embodiments, the third side 218 of the second body 200 may have the piston head 236. Thus, in some embodiments, the connection flange 228 may be omitted, and the chamber 238 may be defined as least in part by the third side 218 of the second body 200 and the piston flange 232.

Connection rods 82 may be disposed through corresponding holes 30 in the piston flange 232, through corresponding holes 30 in the connection flange 228 (if present), and through corresponding holes 30 in the second body 200. The connection rods 82 may be coupled to the tension flange 226. The connection rods 82 may be threadedly coupled to the tension flange 226. In some embodiments, the connection rods 82 may be coupled to the tension flange 226 by corresponding fasteners, such as nuts. In some embodiments, the tension flange 226, connection flange 228, and piston flange 232 may be sized such that the connection rods 82 are not disposed in corresponding holes 30 in the second body 200.

Each connection rod 82 may be coupled to the second body 200 via the connection flange 228 by a corresponding first fastener 244, such as a nut having threads that cooperate with corresponding threads on a corresponding connection rod 82. In embodiments in which the connection flange 238 is omitted, each connection rod may be coupled directly to the second body 200 by the corresponding first fastener 244. Each connection rod 82 may be coupled to the piston flange 232 by a corresponding second fastener 246, such as a nut having threads that cooperate with corresponding threads on a corresponding connection rod 82.

The fluid conduit connector system 166 provides a versatile connector arrangement in that the first opening 204 of the first side 202 of the second body 200 may be positioned at any one of a variety of rotational orientations with respect to the second opening 186 of the first body 170. In some embodiments, the rotational position of the first opening 204 of the first side 202 of the second body 200 with respect to the second opening 186 of the first body 170 may be achieved at any orientation.

In use, the above-mentioned components may be coupled together as described. The connection rods 82 may be secured to the tension flange 226. The connection rods 82 may be secured to the second body 200 by the first fasteners 244. In embodiments in which the connection flange 228 is omitted, the connection rods 82 may be secured to the second body 200 directly by the first fasteners 244. In embodiments in which the connection flange 228 is present, the connection rods 82 may be secured to the second body 200 via the connection flange 228 by the first fasteners 244 bearing against the connection flange 228. The connection rods 82 may be secured to the piston flange 232 by the second fasteners 246.

A source of hydraulic pressure may be coupled to the port 242 in the piston flange 232, such as via a pressure fitting. The source of hydraulic pressure may apply a pressure through the port 242 and into the chamber 238. In embodiments in which the connection flange 228 is present, the chamber 238 may be defined by the piston flange 232 and the connection flange 228, and pressure within the chamber 238 may urge the piston flange 232 and the connection flange 228 to separate, thereby enlarging the chamber 238. In embodiments in which the connection flange 228 is absent, the chamber 238 may be defined by the piston flange 232 and the third side 218 of the second body 200, and pressure within the chamber 238 may urge the piston flange 232 and the second body 200 to separate, thereby enlarging the chamber 238.

In embodiments in which the connection flange 228 is present, the piston flange 232 and the connection flange 228 may not separate entirely. Such separation may place the connection flange 228 and the second body 200 under a compressive load. The piston flange 232 may act on the second fasteners 246, thereby placing the connection rods 82 under a tensile load. The tensile load in the connection rods 82 may be transferred to the neck 174 extending from the first side 172 of the first body 170 via the tension flange 226.

In embodiments in which the connection flange 228 is absent, the piston flange 232 and the second body 200 may not separate entirely. Such separation may place the second body 200 under a compressive load. The piston flange 232 may act on the second fasteners 246, thereby placing the connection rods 82 under a tensile load. The tensile load in the connection rods 82 may be transferred to the neck 174 extending from the first side 172 of the first body 170 via the tension flange 226.

In embodiments in which the connection flange 228 is present, as a result of the tensile load in the connection rods 82 and the compressive load in the connection flange 228 and in the second body 200, the first fasteners 244 may become loosened from securement to the connection flange 228. Hence, the first fasteners 244 may be secured to the connection flange 228 by (for example) tightening the first fasteners 244, such as by via a threaded cooperation between each connection rod 82 and a corresponding first fastener 244. Thereafter, the pressure within the chamber may be relieved, and the source of hydraulic pressure may be disconnected from the port 242. Disassembly of the fluid conduit connector system 166 may be achieved by reversing the steps that are executed during assembly.

In embodiments in which the connection flange 228 is absent, as a result of the tensile load in the connection rods 82 and the compressive load in the second body 200, the first fasteners 244 may become loosened from securement to the second body 200. Hence, the first fasteners 244 may be secured to the second body 200 by (for example) tightening the first fasteners 244, such as by via a threaded cooperation between each connection rod 82 and a corresponding first fastener 244. Thereafter, the pressure within the chamber may be relieved, and the source of hydraulic pressure may be disconnected from the port 242. Disassembly of the fluid conduit connector system 166 may be achieved by reversing the steps that are executed during assembly.

Figure 7A:
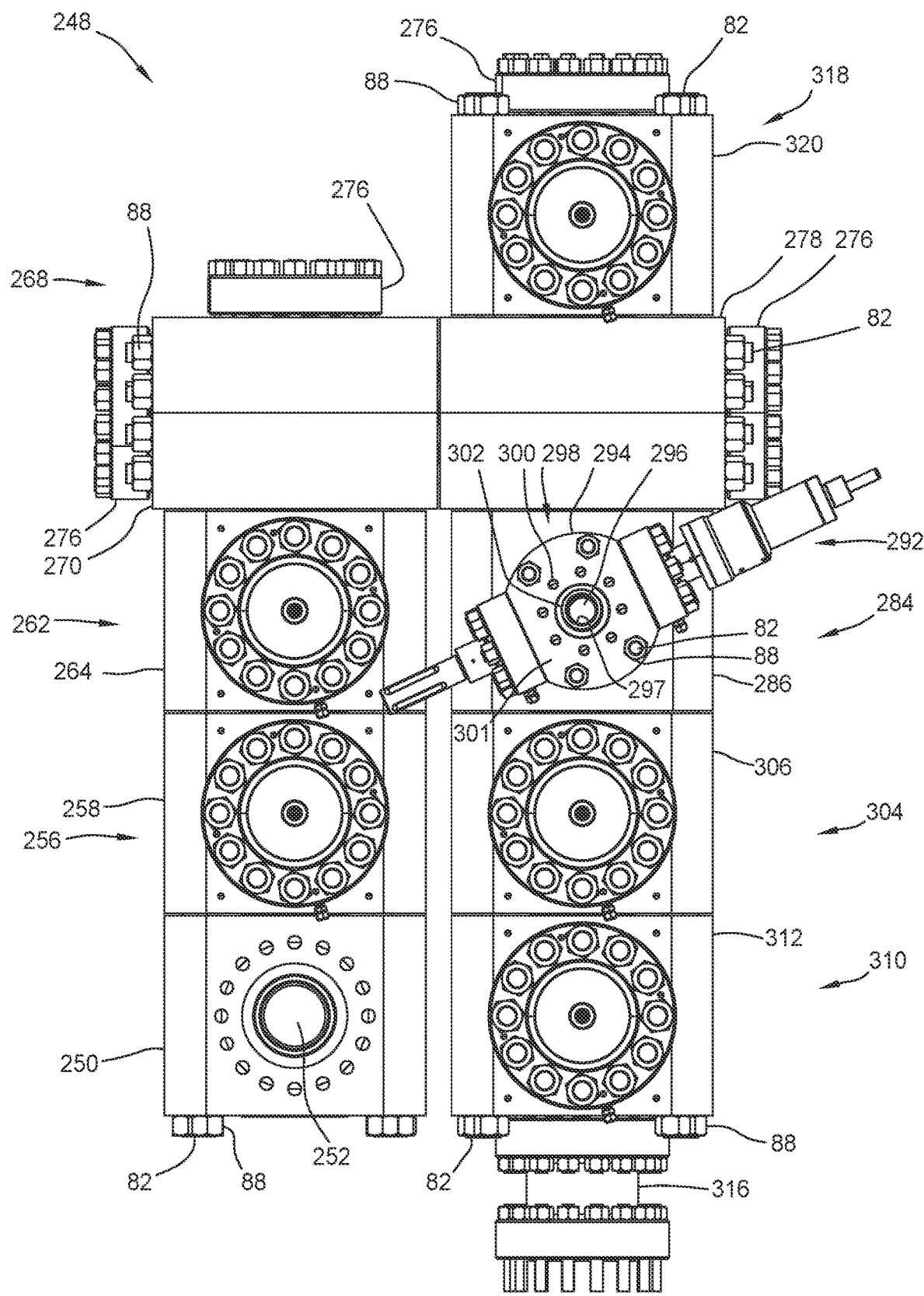
FIG. 7A shows an external view of an embodiment of a valve assembly.
Figure 7B:
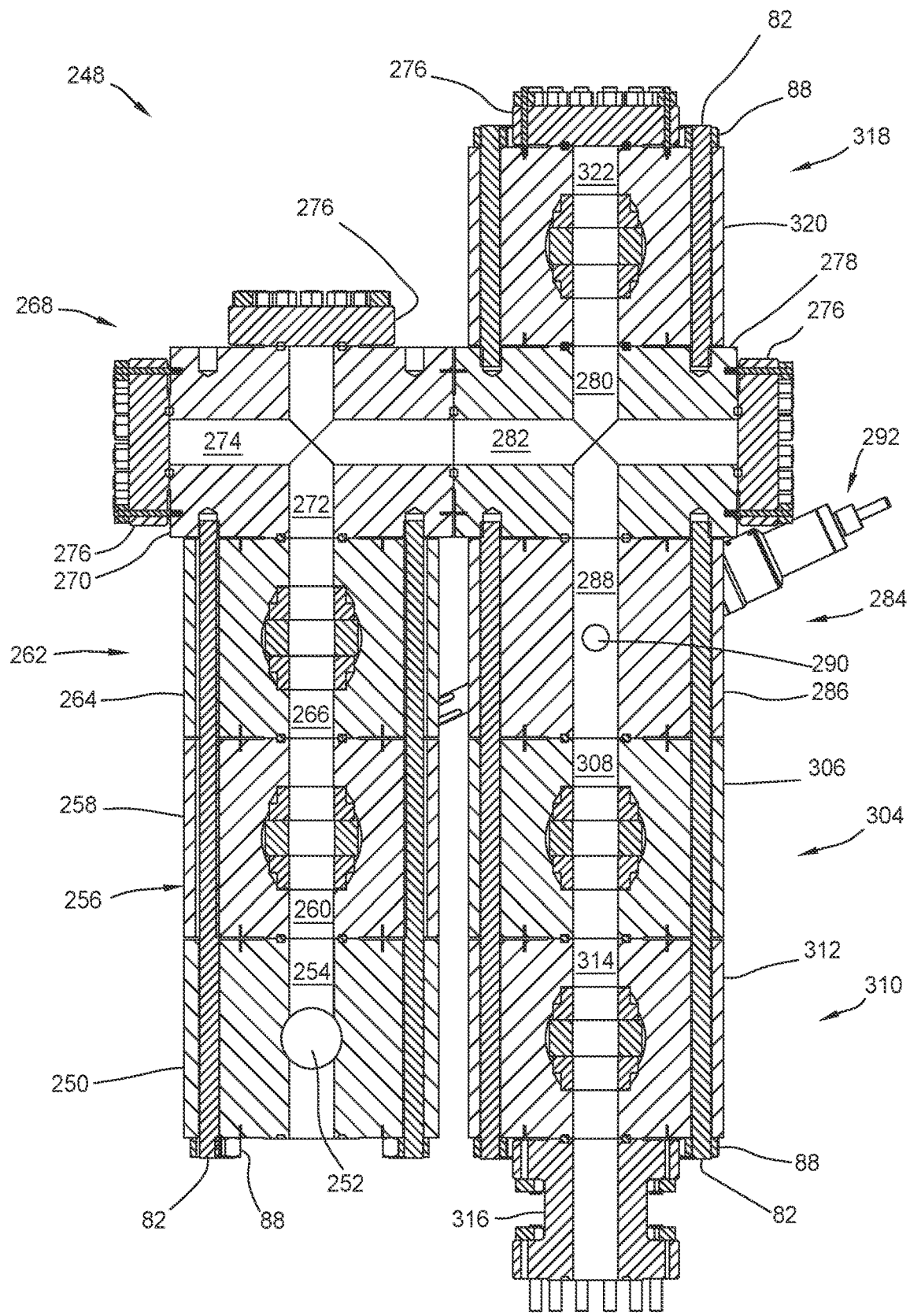
FIG. 7B shows a cross sectional view of the embodiment depicted in FIG. 7A.

FIGS. 7A and 7B illustrate a fluid conduit system that may incorporate one or more aspects of one or more embodiments of the present disclosure. FIG. 7A is a side view of a valve assembly 248. The valve assembly 248 may be used during well servicing operations for routing fluids into and out of a wellbore. For example, the valve assembly 248 may be used for directing treatment fluids into a wellbore, and then routing the production of fluids out of the wellbore afterwards. FIG. 7B is a cross section view of the valve assembly 248 of FIG. 7A.

With reference to FIGS. 7A and 7B, the valve assembly 248 may have a manifold header 250. The manifold header 250 may include features configured to facilitate sealing with, and connection to, other components, such as the features shown and described for any body of a fluid conduit connector of the present disclosure. The manifold header 250 may have a main bore 252. The main bore 252 may extend through the manifold header 250. The manifold header 250 may have a branch bore 254 that intersects the main bore 252.

The manifold header 250 may be coupled to a first manifold valve 256. The first manifold valve 256 may include a body 258, such as a body of a fluid conduit connector of the present disclosure. The body 258 may have a throughbore 260 that is fluidically coupled to the branch bore 254 of the manifold header 250. The throughbore 260 may be substantially aligned with the branch bore 254 of the manifold header 250. In some embodiments, the first manifold valve 256 may be coupled to a second manifold valve 262. The second manifold valve 262 may include a body 264, such as a body of a fluid conduit connector of the present disclosure. The body 264 may have a throughbore 266 that is fluidically coupled to the throughbore 260 of the first manifold valve body 258. The throughbore 266 of the second manifold valve body 264 may be substantially aligned with the throughbore 260 of the first manifold valve body 258.

The second manifold valve 262 may be coupled to a fracture header 268. The fracture header 268 may have a first body 270, such as a body of a fluid conduit connector of the present disclosure. The first body 270 may have a lateral bore 272 that is fluidically coupled to the throughbore 266 of the second manifold valve body 264. The lateral bore 272 may be substantially aligned with the throughbore 266 of the second manifold valve body 264. In some embodiments, the lateral bore 272 may extend completely through the first body 270 of the fracture header 268. The first body 270 of the fracture header 268 may have a longitudinal bore 274 that intersects the lateral bore 272. In some embodiments, the longitudinal bore 274 may extend completely through the first body 270 of the fracture header 268.

The manifold header 250, first manifold valve 256, second manifold valve 262 (if present), and the fracture header 268 may be coupled together with a plurality of connection rods 82. In some embodiments, the connection rods 82 may extend through the manifold header 250, through the first manifold valve body 258, through the second manifold valve body 264 (if present), and into the fracture header 268. The connection rods 82 may be threadedly connected to the first body 270 of the fracture header 268. Each connection rod 82 may have a corresponding fastener 88, such as a nut, securing each connection rod 82 to the manifold header 250.

In embodiments in which the lateral bore 272 of the first body 270 of the fracture header 268 extends through the first body 270, a blind flange 276 may be attached to the first body 270 on a side opposite to the side against which the second manifold valve 262 (if present), or the first manifold valve 256 (if the second manifold valve 262 is not present) is coupled to the first body 270. The blind flange 276 may sealingly obscure the lateral bore 272 of the first body 270 of the fracture header 268.

The fracture header 268 may have a second body 278, such as a body of a fluid conduit connector of the present disclosure. The second body 278 may have a longitudinal bore 282 that is fluidically coupled to the longitudinal bore 274 of the first body 270 of the fracture header 268. The longitudinal bore 282 of the second body 278 of the fracture header 268 may be substantially aligned with the longitudinal bore 274 of the first body 270 of the fracture header 268. In some embodiments, the longitudinal bore 282 may extend through the second body 278. The second body 278 may have a lateral bore 280 that intersects with the longitudinal bore 282. In some embodiments, the lateral bore 280 may extend through the second body 278. The first body 270 of the fracture header 268 and the second body 278 of the fracture header 268 may be coupled together with a plurality of connection rods 82. In some embodiments, the connection rods 82 may extend through the first body 270 of the fracture header 268 and through the second body 278 of the fracture header 268. Each connection rod 82 may have a corresponding fastener 88, such as a nut, securing each connection rod 82 to the first body 270 of the fracture header 268. Each connection rod 82 may have a corresponding fastener 88, such as a nut, securing each connection rod 82 to the second body 278 of the fracture header 268.

In some embodiments, instead of having the first body 270 and the second body 278, the fracture header 268 may have a unitary body that includes the lateral and longitudinal bores 272, 274 of the first body 270 and the lateral and longitudinal bores 280, 282 of the second body 278. In such embodiments, the plurality of connection rods 82 that connect the first body 270 to the second body 278 of the fracture header 268 may be omitted.

In embodiments in which the longitudinal bore 274 of the first body 270 of the fracture header 268 extends through the first body 270, a blind flange 276 may be attached to the first body 270 of the fracture header 268 on a side opposite to the side against which the second body 278 of the fracture header 268 is coupled to the first body 270 of the fracture header 268. The blind flange may sealingly obscure the longitudinal bore 274 of the first body 270 of the fracture header 268. In embodiments in which the longitudinal bore 282 of the second body 278 of the fracture header 268 extends through the second body 278, a blind flange 276 may be attached to the second body 278 of the fracture header 268 on a side opposite to the side against which the first body 270 of the fracture header 268 is coupled to the second body 278 of the fracture header 268. The blind flange 276 may sealingly obscure the longitudinal bore 282 of the second body 278 of the fracture header 268.

As illustrated in FIGS. 7A and 7B, a flow spool 284 may be coupled to the fracture header 268. The flow spool 284 may include a flow spool body 286, such as a body of a fluid conduit connector of the present disclosure. The flow spool body 286 may have a throughbore 288 that is fluidically coupled to the lateral bore 280 of the second body 278 of the fracture header 268. The throughbore 288 of the flow spool body 286 may be substantially aligned with the lateral bore 280 of the second body 278 of the fracture header 268. The flow spool body 286 may have a lateral bore 290 that intersects with the throughbore 288. One or more flow control valves 292 may be coupled to the flow spool body 286 in order to control fluid flow through, and/or fluid pressure within, the lateral bore 290 of the flow spool 284. In some embodiments, the one or more flow control valves 292 may operate as shut-off valves. Each flow control valve 292 may include a flow control valve body 294, such as a body of a fluid conduit connector of the present disclosure. Each flow control valve body 294 may be coupled to the flow spool body 286 using one or more connection components of a fluid connector system of the present disclosure. Each flow control valve body 294 may include a flow bore 296 that is fluidically coupled to the lateral bore 290 of the flow spool body 286. The flow bore 296 of each flow control valve body 294 may be substantially aligned with the lateral bore 290 of the flow spool body 286.

Each flow control valve body 294 may have an array 298 of holes 300 on a first side 301. The array 298 of holes 300 may surround an opening 297 to the flow bore 296, and each hole 300 may be configured to accept a connection stud 92. Each flow control valve body 294 may have a sealing surface 302 surrounding the opening 297. Each sealing surface 297 may be recessed into a raised face on the first side 301. Each sealing surface 297, raised face, and array 298 of holes 300 may be sized and configured to match a flange that meets one or more specifications of one or more of the American Petroleum Institute (API), the American National Standards Institute (ANSI), or the American Society of Mechanical Engineers (ASME). A fluid flow conduit may have a flange configured to mate with the sealing surface 297, raised face, and array 298 of holes 300 on the first side 301 of each flow control valve body 294.

As illustrated in FIG. 7A, each flow control valve body 294 may be secured to the flow spool body 286 by connection rods 82 that may be threaded into the flow spool body 286 and secured by suitable fasteners 88, such as nuts.

A first fracture valve 304 may be coupled to the flow spool 284. The first fracture valve 304 may include a body 306, such as a body of a fluid conduit connector of the present disclosure. The body 306 may have a throughbore 308 that is fluidically coupled to the throughbore 288 of the flow spool body 286. The throughbore 308 of the first fracture valve body may be substantially aligned with the throughbore 288 of the flow spool body 286. In some embodiments, the first fracture valve 304 may be coupled to a second fracture valve 310. The second fracture valve 310 may include a body 312, such as a body of a fluid conduit connector of the present disclosure. The body 312 may have a throughbore 314 that is fluidically coupled to the throughbore 308 of the first fracture valve body 306. The throughbore 314 of the second fracture valve body 312 may be substantially aligned with the throughbore 308 of the first fracture valve body 306.

The fracture header 268, flow spool 284, first fracture valve 304, and second fracture valve 310 (if present) may be coupled together with a plurality of connection rods 82. In some embodiments, the connection rods 82 may extend through the second fracture valve body 312 (if present), through the first fracture valve body 306, through the flow spool body 286, and into the fracture header 268. The connection rods 82 may be threadedly connected to the second body 278 of the fracture header 268. Each connection rod 82 may have a corresponding fastener 88, such as a nut, securing each connection rod 82 to the second facture valve body 312 (if present), or to the first facture valve body 306 if the second fracture valve 310 is omitted.

As shown in FIGS. 7A and 7B, the lowermost valve of the first fracture valve 304 and the second fracture valve 310 may be connected to an adaptor flange 316. The adaptor flange 316 may facilitate connection to a Christmas tree of a well, to a blowout preventer, or to a component of a wellhead.

In some embodiments, a swab valve 318 may be coupled to the fracture header 268. The swab valve 318 may include a body 320, such as a body of a fluid conduit connector of the present disclosure. The body 320 may have a throughbore 322 that is fluidically coupled to the lateral bore 280 of the second body 278 of the fracture header 268. The throughbore 322 of the swab valve body may be substantially aligned with the lateral bore 280 of the second body 278 of the fracture header 268. The swab valve 318 may be coupled to the fracture header 268 with a plurality of connection rods 82. In some embodiments, the connection rods 82 may extend through the swab valve body 320 and into the fracture header 268. The connection rods 82 may be threadedly connected to the second body 278 of the fracture header 268. Each connection rod 82 may have a corresponding fastener 88, such as a nut, securing each connection rod 82 to the swab valve body 322.

In some embodiments, additional conduits and/or connectors may be coupled to the swab valve 318. As shown in FIGS. 7A and 7B, a blind flange 276 may be coupled to the swab valve 318. The blind flange 276 may sealingly obscure the throughbore 322 of the swab valve body 320.

A wellbore treatment operation may be conducted using the valve assembly 248 of FIGS. 7A and 7B. The wellbore treatment operation may involve pumping a treatment fluid into a well to which the valve assembly 248 of FIGS. 7A and 7B is coupled. The treatment fluid may include an acid. The treatment fluid may include a fracturing fluid. The treatment fluid may include an acid fracturing fluid.

The wellbore treatment operation may include coupling the valve assembly 248 of FIGS. 7A and 7B to a well, a source of treatment fluid, and one or more fluid flow conduit. The coupling to the well may be via the adaptor flange 316. The coupling to the source of treatment fluid may be via a trunk line connected to the manifold header 250. The coupling to the one or more fluid flow conduit may be via the one or more flow control valves 292. The wellbore treatment operation may include closing the swab valve 318, and closing the one or more flow control valves 292. The wellbore treatment operation may further include opening the first and second manifold valves 256, 262, and opening the first and second fracture valves 304, 310. Treatment fluid may than be pumped through the manifold header 250, through the first and second manifold valves 256, 262, through the fracture header 268, through the flow spool 284 (but not through the flow control valves 292), through the first and second fracture valves 304, 310, through the adaptor flange 316, and into the well.

The wellbore treatment operation may further include ceasing the pumping of the treatment fluid, and closing the first and second manifold valves 256, 262. In some embodiments, the wellbore treatment operation may further include closing a valve of a Christmas tree of the well and/or closing the first and second fracture valves 304, 310. In some embodiments, the closing of the valve of the Christmas tree of the well and/or closing the first and second fracture valves 304, 310 may be omitted. The wellbore treatment operation may further include opening the flow control valves 292. In embodiments in which the valve of the Christmas tree of the well and/or the first and second fracture valves 304, 310 had been closed, the wellbore treatment operation may include opening the valve of the Christmas tree of the well and/or the first and second fracture valves 304, 310. The wellbore treatment operation may further include flowing fluids out of the well, through the first and second fracture valves 304, 310, into the flow spool 284, and out of the flow spool 284 through the flow control valves 292.

Figure 8:
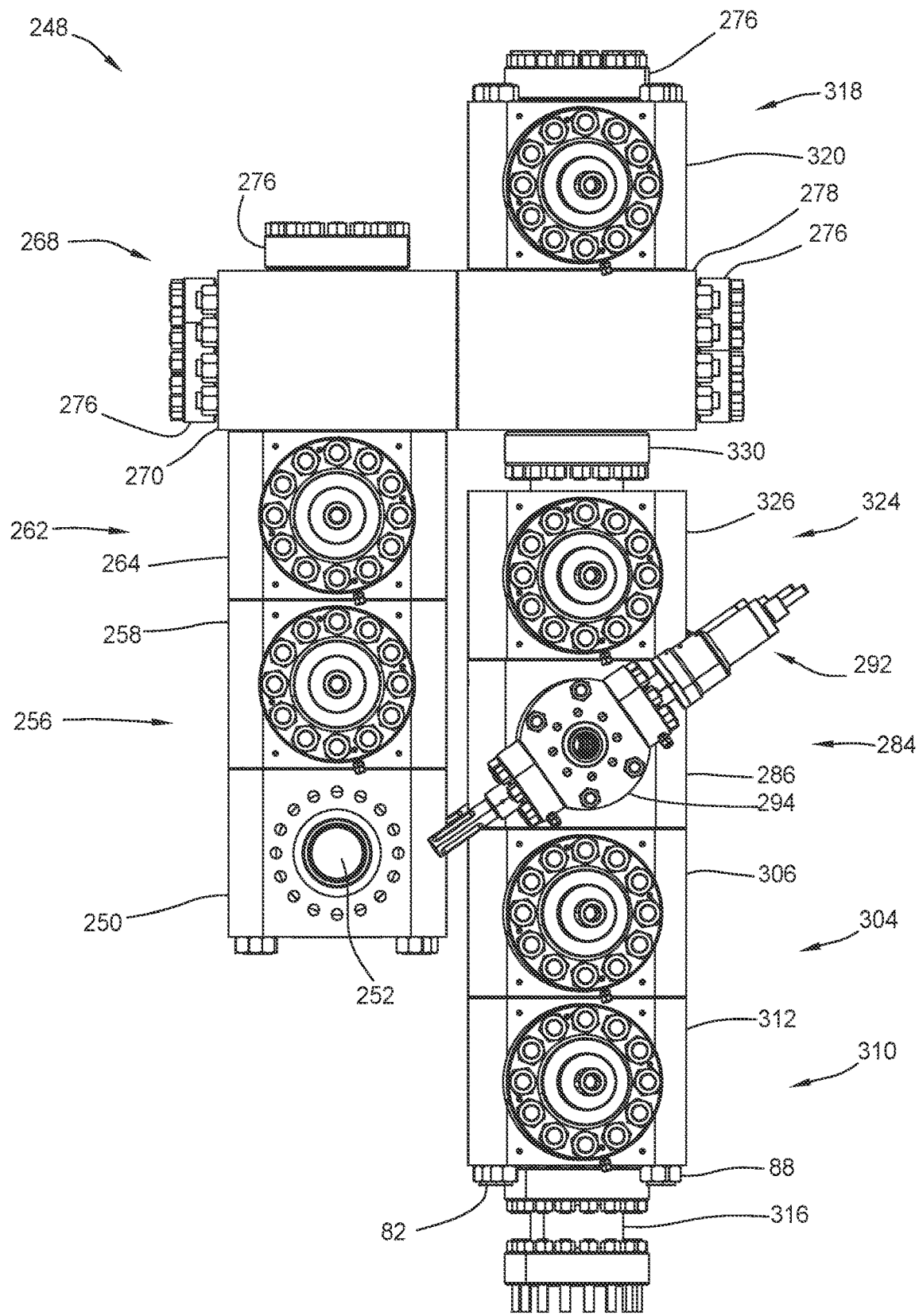
FIG. 8 shows another embodiment of a valve assembly.

FIG. 8 shows an alternative embodiment to the valve assembly of FIGS. 7A and 7B. The valve assembly 248 may include a third fracture valve 324 located between the fracture header 268 and the flow spool 284. The third fracture valve 324 may include a body 326, such as a body of a fluid conduit connector of the present disclosure. The body 326 may have a throughbore (not shown) that is fluidically coupled to the throughbore 288 of the flow spool 284 and the lateral bore 280 of the second body 278 of the fracture header 268. The throughbore of the third fracture valve 324 may be substantially aligned with the throughbore 288 of the flow spool 284 and the lateral bore 280 of the second body 278 of the fracture header 268.

The third fracture valve 324 may be coupled to the fracture header 268 via a flange 330. The third fracture valve 324, flow spool 284, first fracture valve 304, and second fracture valve 310 (if present) may be coupled together with a plurality of connection rods 82. In some embodiments, the connection rods 82 may extend through the second fracture valve body 312 (if present), through the first fracture valve body 306, through the flow spool body 286, and into the third fracture valve body 326. The connection rods 82 may be threadedly connected to the third fracture valve body 326. Each connection rod 82 may have a corresponding fastener 88, such as a nut, securing each connection rod 82 to the second facture valve body 312 (if present), or to the first facture valve body 306 if the second fracture valve 310 is omitted.

A wellbore treatment operation may be conducted using the valve assembly 248 of FIG. 8. The wellbore treatment operation may involve pumping a treatment fluid into a well to which the valve assembly 248 of FIG. 8 is coupled. The treatment fluid may include an acid. The treatment fluid may include a fracturing fluid. The treatment fluid may include an acid fracturing fluid.

A wellbore treatment operation using the valve assembly 248 of FIG. 8 may proceed with operations that are substantially the same as the wellbore treatment operation described above with respect to FIGS. 7A-B. The wellbore treatment operation may further include opening the third fracture valve 324 prior to pumping the treatment fluid into the well. The wellbore treatment operation may further include closing the third fracture valve 324 after ceasing the pumping of treatment fluid, and before flowing fluids out of the well. The wellbore treatment operation may further include maintaining the third fracture valve 324 in a closed position while flowing fluids out of the well and through the flow control valves 292. The wellbore treatment operation may further include disconnecting the fracture header 268 from the third fracture valve 324 before and/or during the flowing of fluids out of the well. Thus, the fracture header 268, first and second manifold valves 256, 262, and manifold header 250 may be at least partially disassembled before and/or during the flowing of fluids out of the well.

Figure 9:
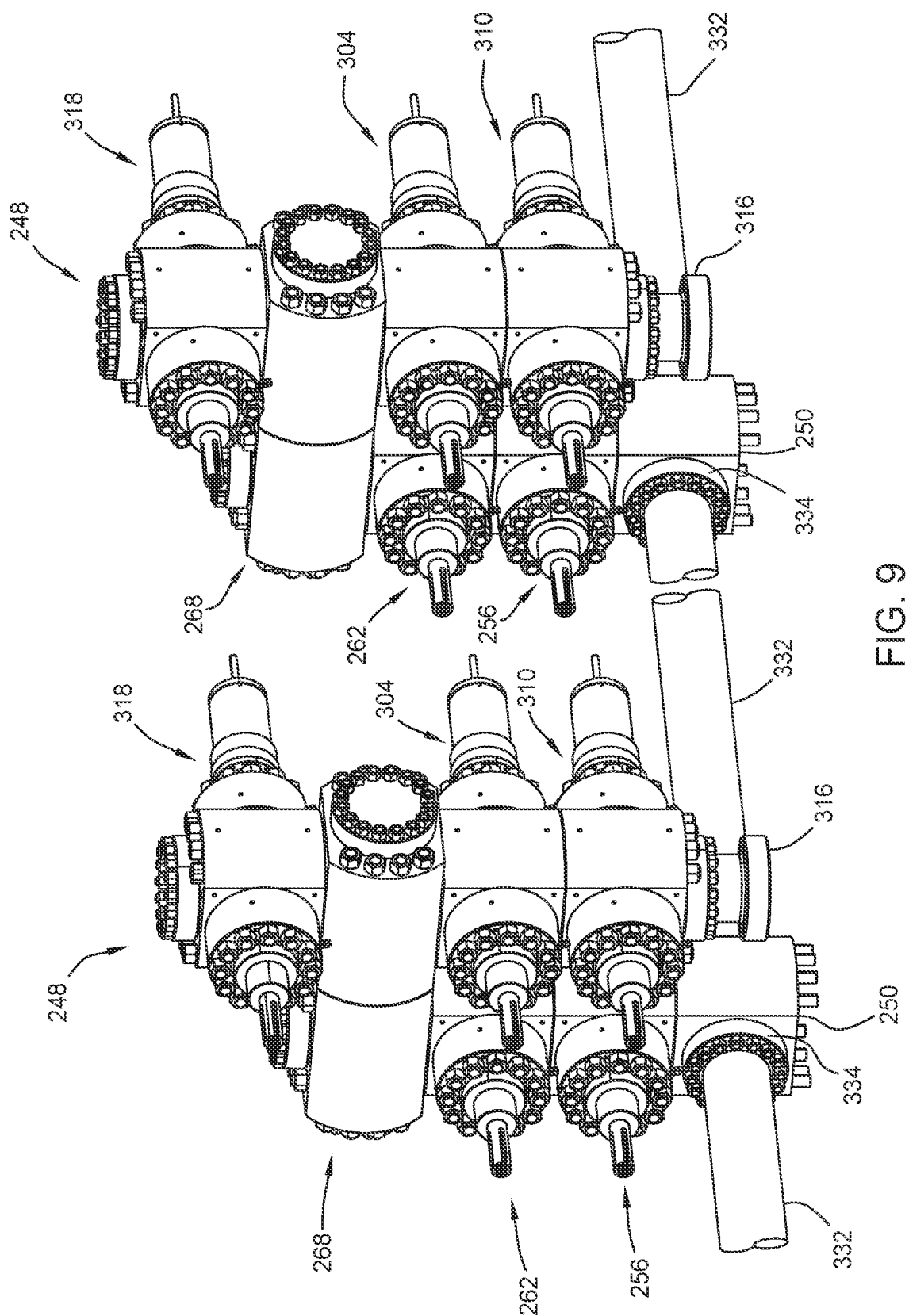
FIG. 9 shows another embodiment of a valve assembly.

FIG. 9 shows an arrangement of multiple valve assemblies. Each valve assembly 248 may be coupled to a respective well. Although illustrated for coupling to two wells, the arrangement of multiple valve assemblies may be configured with additional valve assemblies 248, such that each additional vale assembly 248 may be coupled to a respective additional well. As shown in FIG. 9, each valve assembly 248 omits the flow spool 284 and omits the third fracture valve 324. In some embodiments, one or more valve assembly 248 may be configured as per the valve assembly 248 of FIGS. 7A and 7B. In some embodiments, one or more valve assembly 248 may be configured as per the valve assembly 248 of FIG. 8.

Each valve assembly 248 may be coupled to a trunk line 332. The trunk line 332 may have a trunk line throughbore that is fluidically coupled to the main bore 252 of the manifold header 250 of each valve assembly 248. The trunk line throughbore may be substantially aligned with the main bore 252 of the manifold header 250 of each valve assembly 248. The trunk line 332 may be coupled to each manifold header 250 via a flange 334. The manifold header 250 of each valve assembly 248 may be coupled to, and between, sections of the trunk line 332, such that the manifold headers 250 are interspersed along the trunk line 332. The trunk line 332 may be coupled to the source of treatment fluid. In some embodiments, one or more of the fluid connector systems 166 (as shown in FIGS. 6A-C) and one or more trunk lines 332 may be used to facilitate connection between the manifold header 250 of each valve assembly 248 when the valve assemblies 248 are horizontally and/or vertically offset relative to each other and/or relative to other equipment, such as the source of treatment fluid.

A wellbore treatment operation may be conducted using the arrangement of multiple valve assemblies of FIG. 9. The treatment fluid may include an acid. The treatment fluid may include a fracturing fluid. The treatment fluid may include an acid fracturing fluid.

A wellbore treatment operation using the arrangement of multiple valve assemblies of FIG. 9 may proceed with operations that are substantially the same as the wellbore treatment operations described above with respect to FIGS. 7A-B and/or FIG. 8. In some embodiments, a wellbore treatment operation using the arrangement of multiple valve assemblies of FIG. 9 may proceed with at least some of the steps of the wellbore treatment operations described above with respect to FIGS. 7A-B and/or FIG. 8.

In some embodiments, a wellbore treatment operation using the arrangement of multiple valve assemblies 248 of FIG. 9 may further include connecting each valve assembly 248 to a respective well. The wellbore treatment operation may further include connecting each manifold header 250 of each valve assembly 248 to the trunk line 332. The wellbore treatment operation may further include pumping treatment fluid through the trunk line 332, sequentially through each valve assembly 248, and into each well. The wellbore treatment operation may include sequentially pumping treatment fluid into each well whereby the treatment fluid is pumped into each well in turn, one well at a time. The wellbore treatment operation may further include closing the first and second manifold valves 256, 262 of the valve assemblies 248 associated with wells that are not about to receive the treatment fluid, and opening the first and second manifold valves 256, 262 of the valve assembly 248 associated with the well that is about to receive the treatment fluid. The wellbore treatment operation may further include closing the first and second manifold valves 256, 262 of the valve assembly 248 associated with the well that received the treatment fluid, and opening the first and second manifold valves 256, 262 of the valve assembly 248 associated with another well that is about to receive the treatment fluid. The wellbore treatment operation may thus include using the sequential closing and opening of first and second manifold valves 256, 262 of each valve assembly 248 to direct the treatment fluid into each well sequentially.

The fluid conduit connector systems described herein provide several advantages over conventional systems. Conduits incorporating connector systems of the present disclosure may be routed such that changes in conduit orientation may be achieved with robust compact connectors. Such compactness provides for reduced weight, reduced footprint, and reduced height compared to conventional systems. The fluid conduit connector systems of the present disclosure may be more quickly and easily assembled and disassembled than conventional systems by virtue of reducing the number of flanged connections and the number of bolts/fasteners required for each connection. The fluid conduit connector systems of the present disclosure also provide for versatile, modular arrangements of components, as exemplified by the different configurations illustrated for the valve assemblies 248 of FIGS. 7A-9.

ADDITIONAL EMBODIMENTS

Embodiment 1: A fluid conduit connector system, comprising: a first fluid conduit connector including a first body having a first opening at a first side, a second opening at a second side, and a throughbore extending from the first opening to the second opening; a second fluid conduit connector including a second body having a first opening at a first side, a second opening at a second side, and a throughbore extending from the first opening to the second opening; a first flange including: a first opening at a first side and a second opening at a second side, a throughbore extending from the first opening to the second opening, a first array of holes in the first side positioned around the first opening, each hole of the first array of holes terminating within the first flange, and a second array of holes in the first side positioned between the first array of holes and an edge of the first flange; a second flange including: a first opening at a first side and a second opening at a second side, a throughbore extending from the first opening to the second opening, a first array of holes in the first side positioned around the first opening, each hole of the first array of holes terminating within the second flange, and a second array of holes in the first side positioned between the first array of holes and an edge of the second flange; and a plurality of connection rods; wherein upon assembly: the throughbores of the first flange, the second flange, the first body and the second body are aligned, the second side of the first flange is adjacent to the first side of the first body, the second side of the first body is adjacent to the first side of the second body, the second side of the second body is adjacent to the second side of the second flange, and each connection rod extends through a corresponding hole of the second array of holes of the first flange and through a corresponding hole of the second array of holes of the second flange.

Embodiment 2: The fluid conduit connector system of Embodiment 1, further comprising a seal carrier having: a first opening at a first side and a second opening at a second side, a throughbore extending from the first opening to the second opening, a first seal gland in the first side around the first opening, and a second seal gland in the second side around the second opening.

Embodiment 3: The fluid conduit connector system of Embodiment 2, wherein upon assembly, the seal carrier is disposed between the first body and the second body with the throughbore of the seal carrier aligned with the throughbore of the first body.

Embodiment 4: The fluid conduit connector system of Embodiment 3, wherein the second side of the first body includes a recess configured to receive the seal carrier.

Embodiment 5: The fluid conduit connector system of Embodiment 4, wherein the first side of the second body includes a recess configured to receive the seal carrier, and further wherein upon assembly the seal carrier is disposed in the recess in the second side of the first body and in the recess in the first side of the second body.

Embodiment 6: The fluid conduit connector system of Embodiment 2, wherein upon assembly the seal carrier is disposed between the first flange and the first body with the through bore of the seal carrier aligned with the throughbore of the first body.

Embodiment 7: The fluid conduit connector system of Embodiment 6, wherein the first side of the first body includes a recess configured to receive the seal carrier, and further wherein upon assembly, the seal carrier is disposed in the recess in the first side of the first body.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

The invention claimed is:

1. A fluid conduit system, comprising:
   a trunk line;
   a manifold header coupled to the trunk line;
   a first manifold valve coupled to and positioned above the manifold header;
   a second manifold valve coupled to and positioned above the first manifold valve;
   a fracture header coupled to and positioned above the second manifold valve;
   a plurality of first connection rods that extends through the manifold header, the first manifold valve, and the second manifold valve and terminate into the fracture header, and
   wherein the fracture header comprises a unitary body comprising a plurality of lateral and longitudinal bores; and
   a first fracture valve coupled to and positioned below the fracture header in a position offset from the manifold header, the first manifold valve, and the second manifold valve.

2. The fluid conduit system of claim 1, wherein each first connection rod comprises a thread portion that threads into the fracture header.

3. The fluid conduit system of claim 1, wherein at least one of the plurality of lateral bores intersect at least one of the plurality of longitudinal bores.

4. The fluid conduit system of claim 1, further comprising:
   a swab valve coupled to the fracture header; and
   a plurality of second connection rods that extends through the swab valve and terminate into the fracture header.

5. The fluid conduit system of claim 4, further comprising:
   a second fracture valve coupled to and positioned below the first fracture valve; and
   a plurality of third connection rods that extends through the first fracture valve and the second fracture valve, and terminate into the fracture header.

6. The fluid conduit system of claim 5, further comprising:
   a flow spool disposed between the fracture header and the first fracture valve, wherein the plurality of third connection rods extends through the flow spool.

7. The fluid conduit system of claim 1, further comprising:
   a second fracture valve coupled to and positioned below the first fracture valve; and
   a plurality of second connection rods that extends through the first fracture valve and the second fracture valve, and terminate into the fracture header.

8. The fluid conduit system of claim 7, further comprising:
   a flow spool disposed between the fracture header and the first fracture valve, wherein the plurality of second connection rods extends through the flow spool.

9. The fluid conduit system of claim 1, further comprising:
   a second fracture valve;
   a flow spool;
   a third fracture valve; and
   a plurality of second connection rods that extend through the first fracture valve, the second fracture valve, and the flow spool and terminate into the third fracture valve, wherein the third fracture valve is coupled to the fracture header by a flange.

10. The fluid conduit system of claim 9, wherein the flow spool has a flow spool throughbore and a side outlet.

11. The fluid conduit system of claim 10, wherein the flow spool throughbore is substantially aligned with a throughbore of the first fracture valve and a throughbore of the second fracture valve.

12. The fluid conduit system of claim 1, wherein the manifold header comprises a first bore in fluid communication with the trunk line, and a second bore intersecting the first bore.

13. A method of performing a well treatment operation, comprising:
   coupling a fluid conduit connector system to a well, wherein the fluid conduit connector system comprises:
      a manifold header;
      a manifold valve coupled to and positioned above the manifold header;
      a fracture header coupled to and positioned above the manifold valve;
      a swab valve coupled to the fracture header;
      a flow spool coupled to the fracture header;
      a first fracture valve coupled to and positioned below the fracture header in a position offset from the manifold header and the manifold valve;
      a second fracture valve coupled to and positioned below the first fracture valve;
      a first plurality of connection rods; and
      a second plurality of connection rods, wherein the fracture header is disposed between the swab valve and the flow spool, wherein the flow spool is disposed between the fracture header and the first fracture valve, wherein the first fracture valve is disposed between the flow spool and the second fracture valve, wherein the first plurality of connection rods extends through the second fracture valve, the first fracture valve, and the flow spool and terminate into the fracture header, and wherein the second plurality of connection rods extends through the swab valve and terminate into the fracture header;
   flowing a treatment fluid through the fluid conduit connector system and into the well; and
   flowing a production fluid through the fluid conduit connector system out of the well.

14. The method of claim 13, wherein the fluid conduit connector system is coupled to the well by an adaptor flange.

15. The method of claim 13, wherein flowing the treatment fluid through the fluid conduit connector system and into the well comprises flowing the treatment fluid through the fracture header, the flow spool, the first fracture valve, and the second fracture valve while the swab valve is closed.

16. The method of claim 13, wherein flowing the production fluid through the fluid conduit connector system out of the well comprises flowing the production fluid through the second fracture valve, the first fracture valve, the flow spool, and a side outlet of the flow spool while the swab valve is closed.

17. A method of performing a well treatment operation, comprising:
   assembling a fluid conduit connector system, wherein the fluid conduit connector system comprises:
      a manifold header;
      a first manifold valve coupled to the manifold header;
      a second manifold valve coupled to the first manifold valve;
      a fracture header coupled to the second manifold valve, wherein the fracture header comprises:
         a first fluid conduit connector; and
         a second fluid conduit connector coupled to the first fluid conduit connector; and a first fracture valve coupled to and positioned below the fracture header in a position offset from the manifold header, the first manifold valve, and the second manifold valve;

wherein assembling the fluid conduit connector system comprises coupling the manifold header and the fracture header together by inserting a plurality of first connection rods through the manifold header, the first manifold valve, and the second manifold valve and terminate into the fracture header;

wherein assembly the fluid conduit connector system further comprises coupling the first fluid conduit connector and the second fluid conduit connector together by inserting a plurality of second connection rods extending through the first fluid conduit connector and the second fluid conduit connector;

coupling the assembled fluid conduit connector system to a well; and flowing a treatment fluid through the assembled fluid conduit connector system and into the well.

18. The method of claim 17, wherein the assembled fluid conduit connector system is coupled to the well by an adaptor flange that is coupled to and positioned below the first fracture valve.

19. The method of claim 17, wherein flowing the treatment fluid through the assembled fluid conduit connector system and into the well comprises flowing the treatment fluid through the manifold header, the first manifold valve, the second manifold valve, and the fracture header.

20. The method of claim 17, wherein:

the assembled fluid conduit system further comprises a flow spool, a second fracture valve, and a third plurality of connection rods that extends through the flow spool, the first fracture valve, and the second fracture valve and terminate into the fracture header; and further comprising flowing a production fluid out of the well through the second fracture valve, the first fracture valve, the flow spool, and a side outlet of the flow spool.

* * * * *